US009514716B2

(12) United States Patent
Shinozaki

(10) Patent No.: US 9,514,716 B2
(45) Date of Patent: Dec. 6, 2016

(54) PROJECTION APPARATUS, PROJECTION CONTROL APPARATUS, PROJECTION SYSTEM, AND PROJECTION STATE ADJUSTMENT METHOD

(71) Applicant: CASIO COMPUTER CO., LTD., Shibuya-ku, Tokyo (JP)

(72) Inventor: Yoshihiko Shinozaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 503 days.

(21) Appl. No.: 14/056,797

(22) Filed: Oct. 17, 2013

(65) Prior Publication Data

US 2014/0111536 A1 Apr. 24, 2014

(30) Foreign Application Priority Data

Oct. 19, 2012 (JP) .................. 2012-232379
Oct. 19, 2012 (JP) .................. 2012-232381

(51) Int. Cl.
*G03B 21/14* (2006.01)
*H04N 9/31* (2006.01)
*G09G 5/37* (2006.01)
*G03B 21/26* (2006.01)

(52) U.S. Cl.
CPC .............. *G09G 5/37* (2013.01); *G03B 21/142* (2013.01); *G03B 21/147* (2013.01); *G03B 21/26* (2013.01); *H04N 9/3147* (2013.01); *H04N 9/3185* (2013.01)

(58) Field of Classification Search
CPC ..... G03B 21/147; G03B 21/145; G03B 21/26; G03B 21/142; G03B 21/14; H04N 9/3147; H04N 9/3185; G09G 5/37; G09G 5/373; G09G 3/377

USPC ....................................... 353/69, 70
See application file for complete search history.

(56) References Cited

U.S. PATENT DOCUMENTS 8,162,487 B2 4/2012 Ofune et al.
2010/0045942 A1* 2/2010 Furui .................. H04N 9/3194
353/69
2010/0103385 A1* 4/2010 Kubota ................ G03B 21/147
353/70

(Continued)

FOREIGN PATENT DOCUMENTS

JP 2001-067015 A 3/2001
JP 2005252804 A 9/2005

(Continued)

OTHER PUBLICATIONS

Fujiwara, Shuichi, JP 2001-067015, Mar. 16, 2001; Machine Translation in English.*

(Continued)

*Primary Examiner* — William C Dowling
*Assistant Examiner* — Ryan Howard
(74) *Attorney, Agent, or Firm* — Holtz, Holtz & Volek PC

(57) ABSTRACT

Considered is a case where an adjustment chart is projected larger than a screen that is a projection target and an outer frame is not projected on the screen. The position of a top side of the outer frame can be easily identified from an interval between intersections of a top side of the screen and sides of a rhombus. Similarly, the position of a right side of the outer frame can be easily identified from another interval, and a bottom side of the outer frame from still another interval.

27 Claims, 22 Drawing Sheets

(56) References Cited

U.S. PATENT DOCUMENTS

2011/0211065 A1* 9/2011 Furui .................... G03B 21/14
348/135

FOREIGN PATENT DOCUMENTS

| JP | 2009273015 A | 11/2009 |
| JP | 2011182076 A | 9/2011 |

OTHER PUBLICATIONS

Japanese Office Action (and English translation thereof) dated Aug. 16, 2016, issued in counterpart Japanese Application No. 2012-232381.
Japanese Office Action (and English translation thereof) dated Aug. 23, 2016, issued in counterpart Japanese Application No. 2012-232379.

* cited by examiner

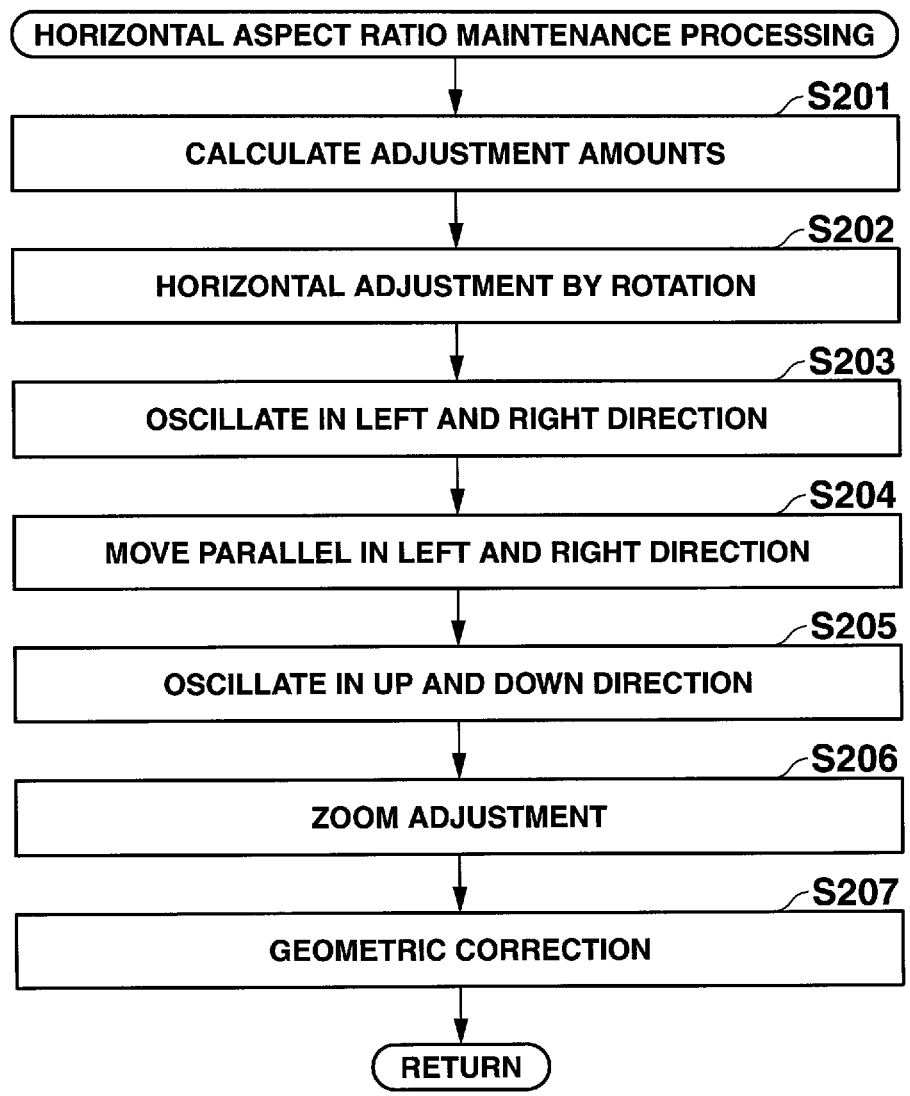

PROJECTION APPARATUS, PROJECTION CONTROL APPARATUS, PROJECTION SYSTEM, AND PROJECTION STATE ADJUSTMENT METHOD

BACKGROUND

1. Technical Field

The present invention relates to a projection apparatus, a projection control apparatus, a projection system, and a projection state adjustment method.

2. Related Art

There is generally known a projector as an image projection apparatus that projects an image based on image data output from a personal computer or the like onto a projection target such as a screen.

When such a projector is placed, a projection area of the projector on the projection target such as a screen is adjusted first.

For example, JP-A-2001-067015 discloses the use of an adjustment chart for such adjustments of a projection area.

For example, when the adjustment chart disclosed in JP-A-2001-067015 is projected larger than the projection target, the position of the contour of the projection area may become unknown.

Especially if the projection target is disposed away from an object such as a wall behind the projection target, the position of the contour of the projection area is harder to identify.

SUMMARY

Therefore, an object of the present invention is to provide a projection apparatus, a projection control apparatus, a projection system, and a projection state adjustment method that can project an image by appropriately adjusting the image even if an adjustment chart is projected larger than a projection target and the contour of a projection area is located outside the projection target.

In order to achieve the above object, a projection apparatus according to one aspect of the present invention includes: an image projection unit configured to project an image onto a projection target; an adjustment chart projection unit configured to project an adjustment chart indicating a projectable area; and an identification unit configured to identify a contour of the projectable area based on a part of the adjustment chart projected by the adjustment chart projection unit.

In order to achieve the above object, a projection control apparatus according to one aspect of the present invention includes: an image projection control unit configured to control a plurality of projection apparatuses to project images onto a projection target; an adjustment chart projection unit configured to project an adjustment chart indicating a projectable area; and an identification unit configured to identify a contour of the projectable area based on a part of the adjustment chart projected by the adjustment chart projection unit.

In order to achieve the above object, a projection system according to one aspect of the present invention includes: the projection control apparatus described above; and a plurality of projection apparatuses to be controlled by the projection control apparatus.

In order to achieve the above object, a projection state adjustment method according to one aspect of the present invention adjusts a projection area on a projection target in a projection apparatus for projecting an image onto the projection target, the method including the processing of: adjusting horizontality or verticality of the projection apparatus with respect to the projection target, and adjusting a reference angle of an angle of view of the projection area; rotating an orientation of the projection apparatus in a horizontal direction or a vertical direction, and making a top side and a bottom side of the projection area horizontal with respect to the projection target or making a left side and a right side of the projection area vertical with respect to the projection target; moving the projection apparatus in the horizontal direction or the vertical direction, and adjusting a position in the horizontal or vertical direction of the projection area with respect to the projection target; rotating the orientation of the projection apparatus in the vertical direction or the horizontal direction, and adjusting the position in the vertical or horizontal direction of the projection area with respect to the projection target; and adjusting an optical system of the projection apparatus, and changing a size of the projection area:

In order to achieve the above object, a projection apparatus according to one aspect of the present invention includes: an image projection unit configured to project an image onto a projection target; a chart generation unit configured to generate an adjustment chart including a line representing a diagonal of an image area; an image capturing unit configured to capture the projection target on which the adjustment chart generated by the chart generation unit has been projected, and to acquire the captured image; a parameter determination unit configured to determine a correction parameter based on a position of an intersection of the projected diagonal and an outer frame of the projection target in the captured image; and an image conversion unit configured to perform a geometric correction on an original image to be projected based on the correction parameter determined by the parameter determination unit.

In order to achieve the above object, a projection control apparatus according to one aspect of the present invention includes: an image projection control unit configured to control a plurality of projection apparatuses to project an image onto a projection target; a chart generation unit configured to generate an adjustment chart including a line representing a diagonal of an image area; a captured image acquisition unit configured to acquire a captured image of the projection target on which the adjustment chart generated by the chart generation unit has been projected by each of the plurality of projection apparatuses; a parameter determination unit configured to determine a correction parameter based on each captured image acquired by the captured image acquisition unit; and an image conversion unit configured to perform a geometric correction on an original image projected by each of the plurality of projection apparatuses based on the correction parameter determined by the parameter determination unit.

In order to achieve the above object, a projection system according to one aspect of the present invention includes: the projection control apparatus described above; and a plurality of projection apparatuses to be controlled by the projection control apparatus.

In order to achieve the above object, a projection state adjustment method according to one aspect of the present invention is used by a projection apparatus for projecting an image onto a projection target, the method including the processing of: projecting an adjustment chart including a line representing a diagonal of an image area; capturing the projection target on which the adjustment chart has been projected and acquiring the captured image; determining, based on the captured image, a correction parameter based on a position of an intersection of the projected diagonal and an outer frame of the projection target; and performing a geometric correction on an original image to be projected, based on the determined correction parameter.

BRIEF DESCRIPTION OF THE DRAWINGS

FIG. 6 is a flowchart illustrating an example of horizontal aspect ratio maintenance processing according to the first embodiment;

DETAILED DESCRIPTION

First Embodiment

A first embodiment will be described with reference to the drawings.

A projection apparatus according to the embodiment uses the digital light processing (DLP) (registered trademark) technology that uses a micromirror display device.

Figure 1:
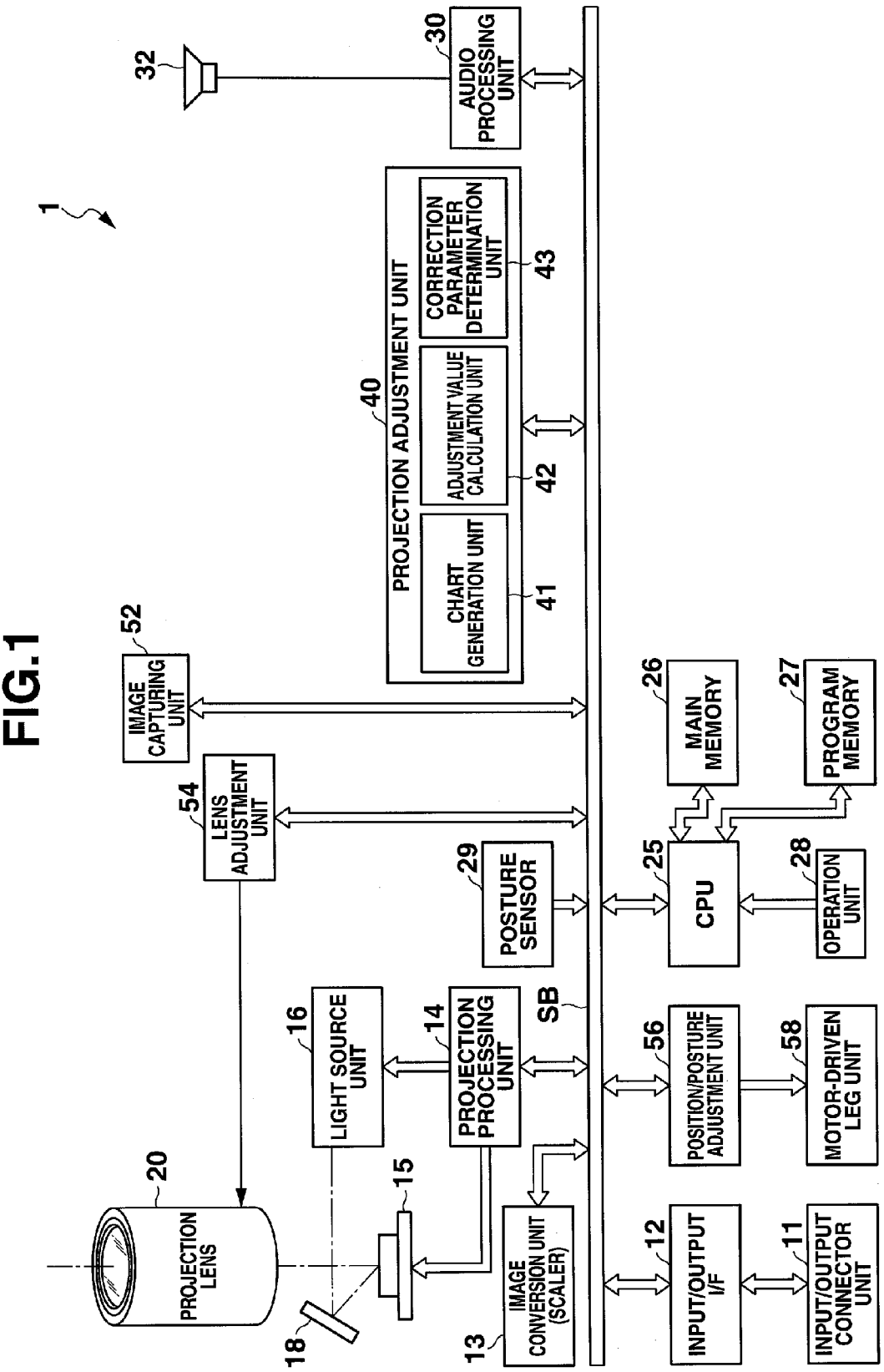
FIG. 1 is a block diagram illustrating an exemplary configuration of a projector according to a first embodiment.

FIG. 1 is a diagram schematically illustrating the configuration of a projector 1 as the projection apparatus according to the embodiment.

The projector 1 includes an input/output connector unit 11, an input/output interface (I/F) 12, an image conversion unit 13, a projection processing unit 14, a micromirror element 15, a light source unit 16, a mirror 18, a projection lens 20, a CPU 25, a main memory 26, a program memory 27, an operation unit 28, a posture sensor 29, an audio processing unit 30, a speaker 32, a projection adjustment unit 40, an image capturing unit 52, a lens adjustment unit 54, a position/posture adjustment unit 56, a motor-driven leg unit 58, and a system bus SB.

The input/output connector unit 11 is provided with terminals such as a pin jack (RCA) video input terminal and a D-sub 15 RGB input terminal, and an analog image signal is input thereinto.

The input image signal is input into the image conversion unit 13 via the input/output I/F 12 and the system bus SB.

Input analog image signals of various standards are converted into digital image signals.

The input/output connector unit 11 may also be provided with, for example, an HDMI (registered trademark) terminal to enable the input of not only an analog image signal but also a digital image signal.

Moreover, an analog or digital audio signal is input into the input/output connector unit 11.

The input audio signal is input into the audio processing unit 30 via the input/output I/F 12 and the system bus SB.

Moreover, the input/output connector unit 11 is also provided with, for example, an RS232C terminal and a USB terminal that are used when connected to, for example, a video apparatus (projection control apparatus) in a second embodiment, which is described below.

The image conversion unit 13 is also called a scaler.

The image conversion unit 13 converts the input image data to adjust resolution, a grayscale level, and the like and generates image data in a predetermined format appropriate for projection.

The image conversion unit 13 transmits the converted image data to the projection processing unit 14.

The image conversion unit 13 transmits, to the projection processing unit 14, image data on which symbols representing various operating states for an on-screen display (OSD) have been superimposed, as processed image data, when necessary.

Moreover, the image conversion unit 13 performs a geometric correction (transformation) on a projected image when necessary to project, onto a projection target such as a screen, an image in an appropriate shape in accordance with a projection state.

The light source unit 16 emits light of a plurality of colors including the primary colors of red (R), green (G), and blue (B).

The light source unit 16 is configured to sequentially emit the plurality of colors divided in time (in a time sharing manner).

The light emitted from the light source unit 16 is totally reflected by the mirror 18 and enters the micromirror element 15.

The micromirror element 15 includes a plurality of micromirrors arranged in an array.

The micromirrors operate on/off at high speeds, and reflect the light emitted from the light source unit 16 in a direction of the projection lens 20, or divert the light in a direction away from the projection lens 20.

A necessary number of the micromirrors for, for example, WXGA (Wide eXtended Graphic Array) (1280 pixels wide× 800 pixels high) is arranged in the micromirror element 15.

With the reflection from the micromirrors, the micromirror element 15 forms an image in, for example, the WXGA resolution.

In this manner, the micromirror element 15 functions as a spatial optical modulator.

The projection processing unit 14 drives the micromirror element 15 to display an image represented by the image data transmitted from the image conversion unit 13 in accordance with the image data.

In other words, the projection processing unit 14 operates on/off of the micromirrors of the micromirror element 15.

The projection processing unit 14 carries out the time sharing drive of the micromirror element 15 at high speed.

The number of divisions of a unit time is obtained by multiplying a frame rate in accordance with a predetermined format, for example, 60 [frames/second], the number of divided color components, and the number of display gray-scale levels.

Moreover, the projection processing unit 14 also controls the operation of the light source unit 16 in synchronization with the operation of the micromirror element 15.

In other words, the projection processing unit 14 divides each frame in time, and controls the operation of the light source unit 16 to sequentially emit the light of all the color components in each frame.

The projection lens 20 adjusts the light guided from the micromirror element 15 to light to be projected onto a projection target (not illustrated) such as a screen.

Therefore, an optical image formed by the reflected light from the micromirror element 15 is projected and displayed on the projection target such as a screen via the projection lens 20.

The projection lens 20 includes a zoom mechanism and has a function of changing the size of an image to be projected.

Moreover, the projection lens 20 includes a focus adjustment mechanism for adjusting the focus state of a projected image.

In this manner, the projection processing unit 14, the micromirror element 15, the light source unit 16, the projection lens 20, and the like function as a projection unit that projects an image.

The audio processing unit 30 includes a sound generator such as a PCM sound source.

The audio processing unit 30 drives the speaker 32 to amplify and release sounds based on analog audio data input from the input/output connector unit 11 or based on an analog signal obtained by converting digital audio data given upon projection operation.

Moreover, the audio processing unit 30 generates a beep sound and the like when necessary.

The speaker 32 is a general speaker that emits the sound based on the signal input from the audio processing unit 30.

The CPU 25 controls the operation of the image conversion unit 13, the projection processing unit 14, the audio processing unit 30, and a projection adjustment unit 40, a lens adjustment unit 54, and a position/posture adjustment unit 56, which are described below.

The CPU 25 is connected to the main memory 26 and the program memory 27.

The main memory 26 includes, for example, an SRAM.

The main memory 26 functions as working memory of the CPU 25.

The program memory 27 includes an electrically rewritable nonvolatile memory.

The program memory 27 stores an operating program that is executed by the CPU 25, various fixed-format data, and the like.

Moreover, the CPU 25 is connected to the operation unit 28.

The operation unit 28 includes a key operation unit provided to a main body of the projector 1, and an infrared light receiving unit that receives infrared light from a remote control (not illustrated) dedicated to the projector 1.

The operation unit 28 outputs, to the CPU 25, a key operation signal based on a key operated by a user with the key operation unit of the main body or the remote control.

The CPU 25 uses the program and data stored in the main memory 26 and the program memory 27 to control the operation of the units of the projector 1 in accordance with the user's instruction from the operation unit 28.

The posture sensor 29 includes, for example, a three-axis accelerometer and a direction sensor that detects a direction.

The accelerometer detects a posture angle of the projector 1 with respect to the gravity direction, in other words, the pitch and roll angles.

The yaw angle is detected as a relative bearing to a reference direction detected by the direction sensor.

The posture sensor 29 outputs the detection result to the projection adjustment unit 40.

The image capturing unit 52 can capture an image projected by the projector 1.

The image capturing unit 52 captures an image under the instruction of the projection adjustment unit 40 and outputs the captured data to the projection adjustment unit 40.

The lens adjustment unit 54 drives the zoom mechanism of the projection lens 20 under the instruction of the projection adjustment unit 40.

The lens adjustment unit 54 drives the zoom mechanism, and consequently, the size of the projected image is changed.

Moreover, the lens adjustment unit 54 drives a focus lens of the projection lens 20 under the instruction of the projection adjustment unit 40.

The motor-driven leg unit 58 changes the position and posture of the projector 1 as a position/posture adjustment mechanism.

In other words, the motor-driven leg unit 58 changes the length of a leg to enable the adjustment of the horizontality of the projector 1.

Moreover, the motor-driven leg unit 58 can adjust a projection direction in the up, down, left and right directions by oscillating operations (direction changing operations) without changing the position of the projector 1.

Moreover, the motor-driven leg unit 58 includes, for example, a wheel, and can move the position of the projector parallel in the front, back, left and right directions, for example, on a desk where the projector 1 is placed.

The position/posture adjustment unit 56 drives the motor-driven leg unit 58 under the instruction of the projection adjustment unit 40.

The projection adjustment unit 40 uses the position and posture of the projector 1, the magnifying power of the projection lens, the geometric correction of an image, and the like, and makes adjustments to appropriately project an image onto a projection target such as a screen.

The projection adjustment unit 40 includes a chart generation unit 41, an adjustment value calculation unit 42, and a correction parameter determination unit 43.

The chart generation unit 41 controls the projection of an adjustment chart.

The chart generation unit 41 reads the adjustment chart stored in the program memory 27, transmits the data of the adjustment chart to the projection processing unit 14, and projects the adjustment chart.

The adjustment value calculation unit 42 calculates adjustment values such as drive amounts of the units of the projector 1 based on, for example, a captured image captured by the image capturing unit 52.

The adjustment values include, for example, the drive amounts of the focus lens and zoom lens of the projection lens 20, the change amount of the leg length of the motor-driven leg unit, the oscillation amounts in the up, down, left, and right directions, and the moving amount of parallel movement.

The adjustment value calculation unit 42 outputs the calculated adjustment values to the lens adjustment unit 54 and the position/posture adjustment unit 56.

The correction parameter determination unit 43 calculates the geometric correction amount of a projected image.

The correction parameter determination unit 43 determines a correction parameter related to the geometric correction of an image to be projected including an adjustment chart.

The correction parameter determination unit 43 outputs the determined correction parameter to the chart generation unit 41.

The chart generation unit 41 performs a geometric correction on an adjustment chart based on the correction parameter acquired from the correction parameter determination unit 43.

Moreover, the correction parameter determination unit 43 outputs the determined correction parameter to the image conversion unit 13.

When displaying an image other than the adjustment chart, the image conversion unit 13 performs a geometric correction on the image based on the correction parameter acquired from the correction parameter determination unit 43.

The operation of the projector 1 according to the embodiment will be described.

First, the projection operation of the projector 1 will be described.

The projection operation is executed by the projection processing unit 14 under the control of the CPU 25.

The operation of the light source unit 16 is controlled by the projection processing unit 14.

The projection processing unit 14 switches on or off semiconductor lasers or LEDs in the light source unit 16 that emit colors and changes the combination of these light sources and phosphors, and the like and accordingly causes the light source unit 16 to sequentially emit three-color light of, for example, red light (R), green light (G), and blue light (B).

The projection processing unit 14 causes the micromirror element 15 to sequentially let in red, green, and blue light from the light source unit 16.

For light of each color, the micromirror element 15 prolongs time to guide the incident light to the projection lens 20 with increasing grayscale level based on image data and shortens time to guide the incident light to the projection lens 20 with decreasing grayscale level, on a micromirror by micromirror (pixel by pixel) basis.

In other words, the projection processing unit 14 controls the micromirror element 15 so as to maintain the micromirror corresponding to a pixel at high grayscale level on for a long time and to maintain the micromirror corresponding to a pixel at low grayscale level off for a long time.

By doing so, the light emitted from the projection lens 20 can represent a grayscale level of each color, on a micromirror by micromirror (pixel by pixel) basis.

A color image is represented by combining, for each color, grayscale levels represented by a period during which the micromirror stays on, on a frame by frame basis.

As described above, the projection lens 20 emits projection light representing an image.

The projection light is projected onto, for example, a screen to display a color image on the screen or the like.

In the above description, the example of the projector that uses three colors of red, green, and blue light has been illustrated. However, the projector may be configured to emit the light of these colors in a manner of combining complementary colors such as magenta and yellow, white light, and the like and forming an image.

Next, a projection state adjustment according to the embodiment will be described.

The projection state adjustment is an adjustment for projecting video in, for example, a rectangular shape that is as large as possible and has as minimum distortion as possible, onto a projection target such as a screen.

The projection state adjustment is made, for example, when the projector 1 is placed.

In the embodiment, an adjustment chart is used for the projection state adjustment.

First, the adjustment chart will be described.

Figure 2:
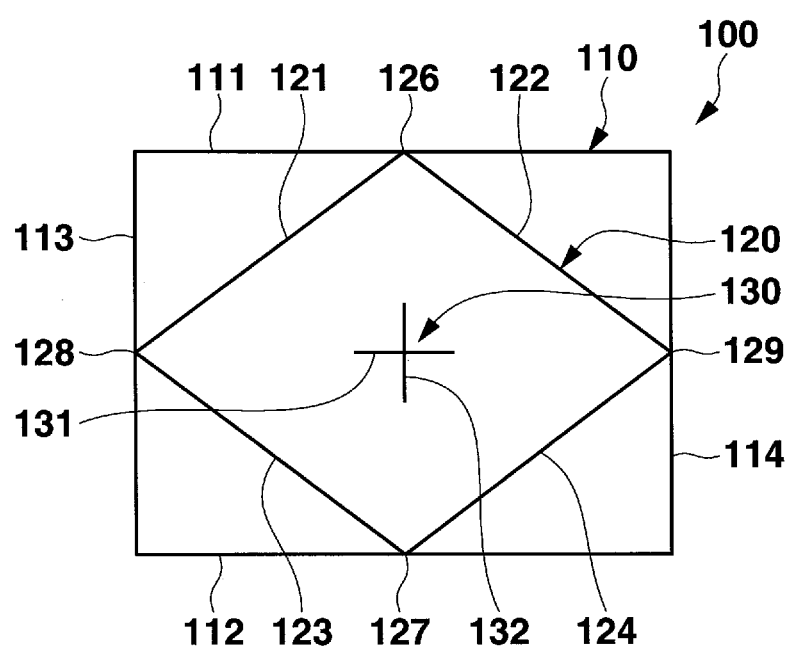
FIG. 2 is a diagram illustrating an example of an adjustment chart according to the first embodiment.

FIG. 2 is a diagram illustrating an example of the adjustment chart.

As illustrated in the diagram, an adjustment chart 100 includes an outer frame 110 representing an outermost side of a projection area.

The outer frame 110 includes a top side line 111, a bottom side line 112, a left side line 113, and a right side line 114.

Moreover, the adjustment chart 100 includes a rhombus 120 inscribed in the outer frame 110.

The rhombus 120 includes sides 121, 122, 123, and 124.

The sides 121 and 122 intersect at a top vertex 126. The top vertex 126 is located at the center of the top side line 111.

The sides 123 and 124 intersect at a bottom vertex 127. The bottom vertex 127 is located at the center of the bottom side line 112.

The sides 121 and 123 intersect at a left vertex 128. The left vertex 128 is located at the center of the left side line 113.

The sides 122 and 124 intersect at a right vertex 129. The right vertex 129 is located at the center of the right side line 114.

Furthermore, the adjustment chart 100 includes a cross mark 130 having an intersection at a barycenter of the outer frame 110.

The cross mark 130 includes a horizontal line 131 and a vertical line 132.

According to such an adjustment chart 100, a positional relationship between a projection area by the projector 1 and a projection target such as a screen can be obtained in the following manner.

Figure 3A:
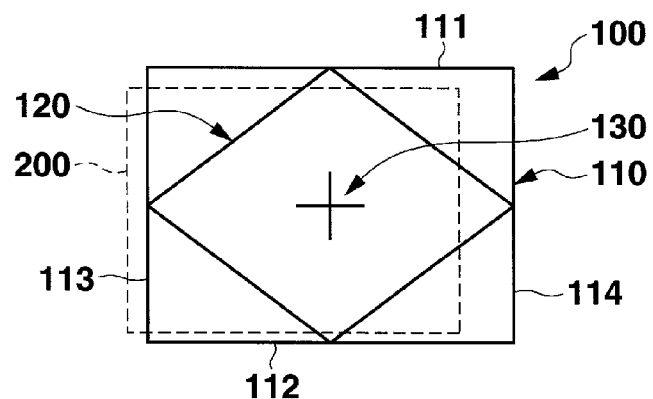
FIGS. 3A to 3D are diagrams for explaining the adjustment chart according to the first embodiment.

In other words, for example, as illustrated in FIG. 3A, the adjustment chart 100 is assumed to be projected on a screen 200 indicated by a broken line.

Figure 3B:
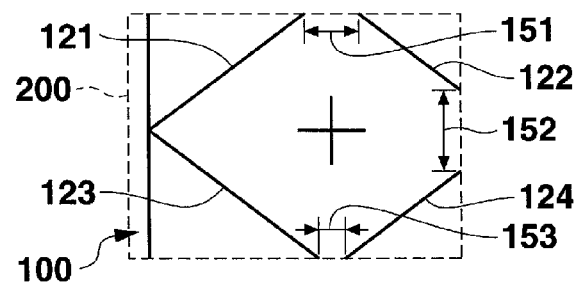

At this point, when the screen 200 is away from a wall behind it, only a part of the adjustment chart 100, which is being projected on the screen 200, can be seen as illustrated in FIG. 3B.

Figure 3C:
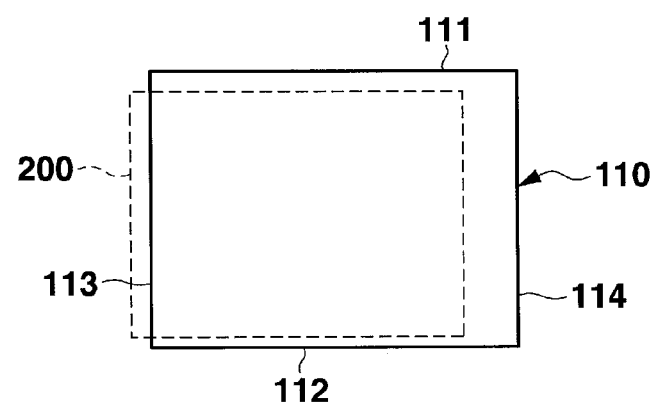
Figure 3D:
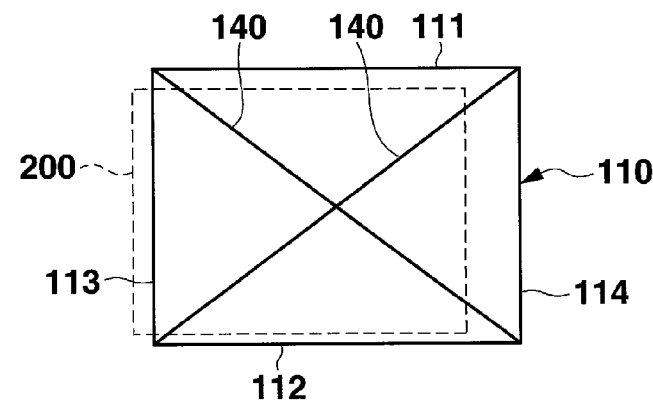

Therefore, for example, if the adjustment chart 100 has only the outer frame 110 as illustrated in FIG. 3C, or if the adjustment chart has only the outer frame 110 and diagonals 140 of the outer frame 110 as illustrated in FIG. 3D, the positions of the sides that are not being projected on the screen 200, such as the top side line 111, become unknown.

On the other hand, with the adjustment chart 100 according to the embodiment, the position of the top side line 111 can be estimated based on an interval 151 formed by the sides 121 and 122, as illustrated in FIG. 3B.

Similarly, the position of the right side line 114 can be estimated based on an interval 152 formed by the sides 122 and 124.

Similarly, the position of the bottom side line 112 can be estimated based on an interval 153 formed by the sides 123 and 124.

In this manner, even if the top side line 111, the bottom side line 112, the left side line 113, and the right side line 114 are not projected on the screen 200, the positions of the sides can be estimated based on the rhombus 120 touching the top side line 111, the bottom side line 112, the left side line 113, and the right side line 114.

Therefore, with the adjustment chart 100 according to the embodiment, adjustments of the projection position on the screen 200 can be made quickly and easily.

Moreover, the inclination of the adjustment chart 100 due to the inclination of the projector 1, and the like can be detected by the rhombus 120 alone. However, the cross mark 130 is also provided and accordingly the inclination of the adjustment chart 100 can be detected more easily. Therefore, it is preferred that the cross mark 130 be also provided.

FIGS. 3A to 3D are diagrams illustrating the adjustment chart 100 taking, as an example, a case of projecting from directly in front of the screen 200, for simplification.

In contrast, for example, if the projector 1 is placed below the center of the screen 200, a projection area where light is projected via the projection lens 20 is distorted into a trapezoid.

When the projection area is distorted in a trapezoid or the like, a correction using geometric correction may be generally made to correct the distortion.

Figure 4A:
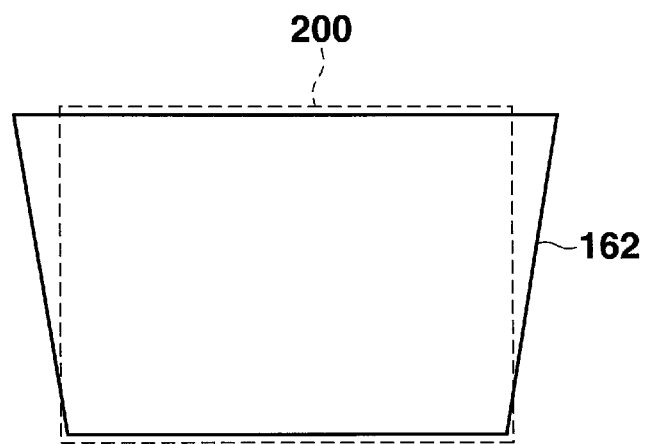
FIGS. 4A and 4B are diagrams for explaining geometric correction.
Figure 4B:
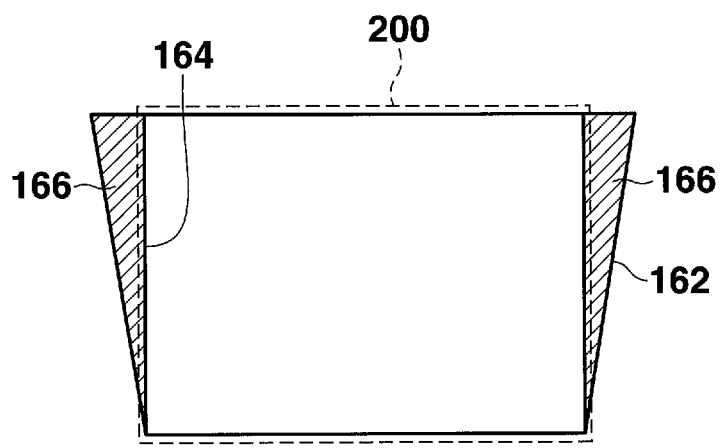

In other words, for example, as illustrated in FIG. 4A, if a projection area 162 that can be projected onto the screen 200 is distorted in a trapezoid, as illustrated in FIG. 4B, the geometric correction of a projected image may be performed so as to project the image in a rectangular corrected image area 164.

At this point, areas 166 illustrated with oblique lines in FIG. 4B are displayed in black.

In other words, when the geometric correction is performed, only a part of an area where the projector 1 can project is used.

As a result, the brightness of the projected image relatively decreases compared with a case where the whole of the area where the projector 1 can project is used.

Moreover, in this case, the resolution of the image to be projected also decreases.

Hence, if an image is projected to the size of the screen 200 by the geometric correction, it is preferred that the position and posture of the projector 1 be adjusted such that the projection area 162 is circumscribed around the screen 200, in other words, the projection area 162 is larger than the screen 200 and the projection area 162 is as small as possible.

Also in such a case where the geometric correction is performed, the adjustment chart 100 according to the embodiment takes effects.

In other words, if the adjustment chart 100 according to the embodiment is used, the outer frame 110 can be detected even if it is located outside the screen 200. Accordingly, the position and posture of the projector 1 can be adjusted such that the projection area is circumscribed around the screen 200.

As a result, also in the case where the geometric correction is used, the highest possible brightness and resolution can be obtained.

Figure 5:
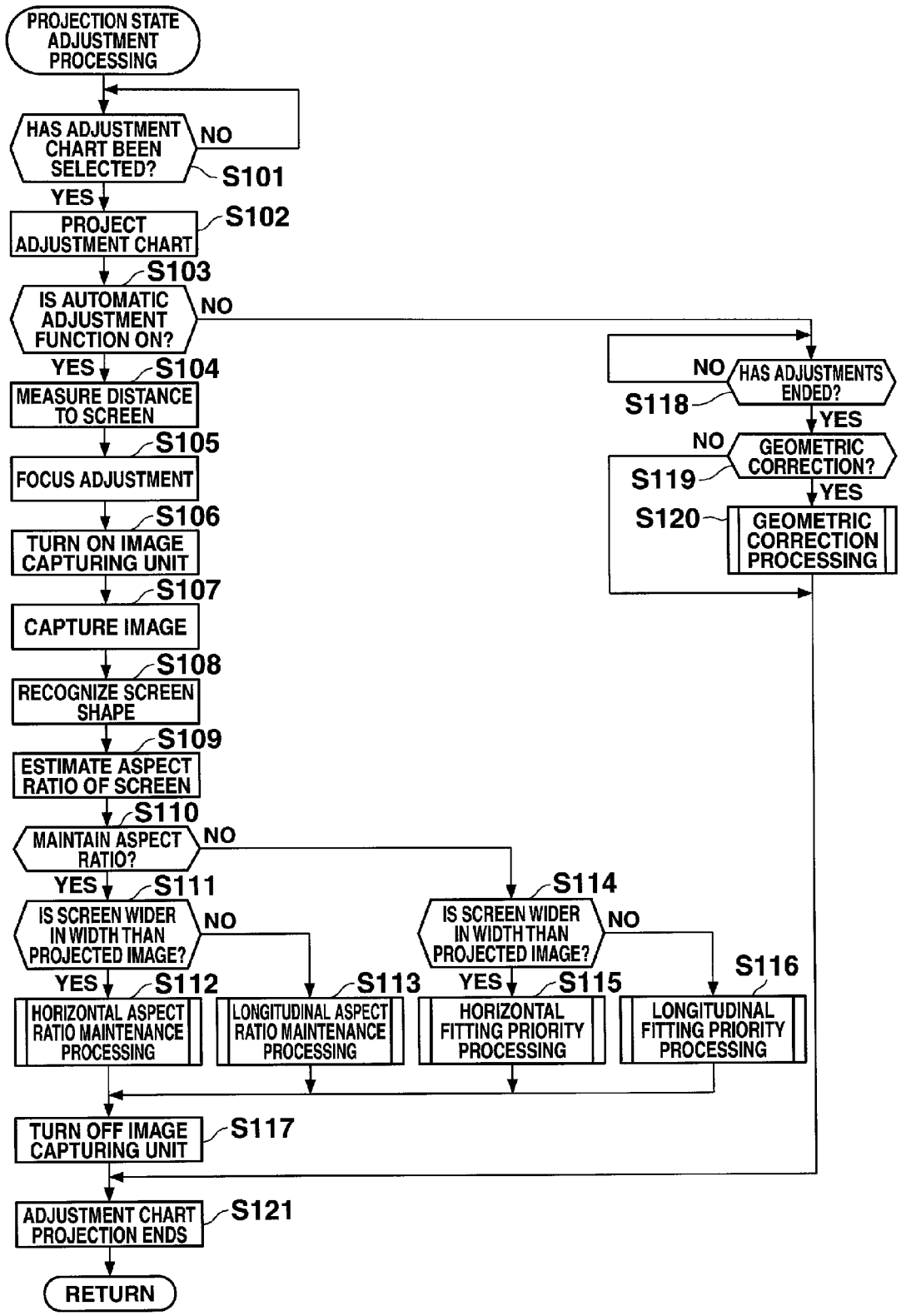
FIG. 5 is a flowchart illustrating an example of projection state adjustment processing according to the first embodiment.

FIG. 5 is a flowchart representing an example of projection state adjustment processing according to the embodiment.

The projector 1 includes, for example, a plurality of adjustment charts illustrated in, for example, FIG. 2 in the program memory 27.

A user selects one adjustment chart in the projection state adjustment.

In Step S101, the projection adjustment unit 40 determines whether or not the adjustment chart has been selected.

If it is determined that the adjustment chart has not been selected, processing repeats Step S101 and waits.

On the other hand, if it is determined that the adjustment chart has been selected, processing proceeds to Step S102.

The number of adjustment charts prepared may be one. In this case, the process of Step S101 does not need to be performed.

In Step S102, the projection adjustment unit 40 reads data of the adjustment chart from the program memory 27, and projects the adjustment chart.

In other words, the projection adjustment unit 40 outputs image information of the adjustment chart to the projection processing unit 14 and instructs the projection processing unit 14 to project the adjustment chart.

In Step S103, the projection adjustment unit 40 determines whether or not an automatic adjustment function is on.

If it is determined to be on, processing proceeds to Step S104.

In Step S104, the projection adjustment unit 40 measures a distance to the screen.

A distance measurement method may use any known technology such as those using ultrasound and infrared light.

In Step S105, the projection adjustment unit 40 adjusts the focus.

The focus adjustment may be performed based on the contrast of the projected adjustment chart.

In this case, the distance measurement of Step S104 is not made and image capturing, which is described below, is repeatedly performed.

In Step S106, the projection adjustment unit 40 puts the image capturing unit 52 in standby.

In Step S107, the projection adjustment unit 40 causes the image capturing unit 52 to capture an image, and acquires the captured image that has captured the current projection state where the screen and the adjustment chart has been projected onto it.

In Step S108, the projection adjustment unit 40 recognizes the shape of the screen viewed from the projector 1 based on the captured image.

The projection adjustment unit 40 can recognize the shape of the screen, for example, by detecting edges corresponding to the screen in the captured image.

In Step S109, the projection adjustment unit 40 estimates the aspect ratio of the screen based on the captured image.

In other words, for example, the ratio of the width of the screen to the height of the screen is calculated based on the shape of the screen recognized in Step S108.

If the projector 1 is not located in front of the screen, but located obliquely, the shape of the screen is, for example, a trapezoid in the captured image.

In such a case, the aspect ratio may be calculated based on central values representing the width and height such as the width and height at the center of the screen, or the average value of the widths and the average value of the heights.

Moreover, the aspect ratio may be calculated by performing an inverse operation on the actual shape of the screen based on the trapezoidal shape in the captured image.

The projector 1 according to the embodiment is prepared with an aspect ratio maintenance setting and a fitting priority setting.

In the aspect ratio maintenance setting, the aspect ratio of an image to be projected is maintained.

If the aspect ratio of the projected image and the aspect ratio of the screen do not agree with each other, a margin area where the image is not projected is provided to the screen.

On the other hand, in the fitting priority setting, the aspect ratio of the projected image is adjusted in accordance with the aspect ratio of the screen, and the image is projected onto the entire screen.

At this point, the projected image is adjusted by the geometric correction in accordance with the aspect ratio of the screen and accordingly, the image is distorted in the vertical or horizontal direction.

Moreover, as described below, projection is performed on a large scale to perform a geometric correction without using a part of the area where the projector 1 projects (displaying a black image). Therefore, the brightness of the projected image decreases accordingly.

In Step S110, the projection adjustment unit 40 determines whether or not to be in the aspect ratio maintenance setting.

If it is determined to be in the aspect ratio maintenance setting, processing proceeds to Step S111.

In Step S111, the projection adjustment unit 40 determines whether or not the screen is wider in width than the projected image.

If it is determined that the screen is wider in width than the projected image, processing proceeds to Step S112.

In Step S112, the projection adjustment unit 40 performs horizontal aspect ratio maintenance processing.

The horizontal aspect ratio maintenance processing will be described with reference to the flowchart illustrated in FIG. 6 and FIGS. 7A to 7G.

In FIGS. 7A to 7G, a broken line represents the screen 200 and a solid line represents the projected adjustment chart 100.

In Step S201, the projection adjustment unit 40 calculates the adjustment amounts of the position and posture of the projector 1 based on the captured image.

The adjustment amounts are amounts necessary for adjustments described below.

In Step S202, the projection adjustment unit 40 causes the position/posture adjustment unit 56 to make a rotation adjustment based on the adjustment amount calculated in Step S201.

In other words, the length of the leg supporting the projector 1 is adjusted, and the horizontality of the projector 1 is adjusted (the adjustment of the reference angle of the angle of view (a roll adjustment) is made).

Figure 7A:
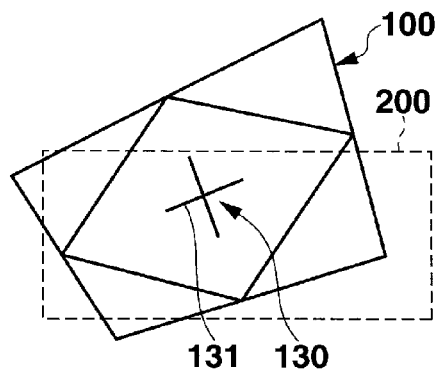
FIGS. 7A to 7G are diagrams for explaining the horizontal aspect ratio maintenance processing according to the first embodiment and illustrating examples of a relationship between a screen and the adjustment chart depending on the position and posture of the projector.
Figure 7B:
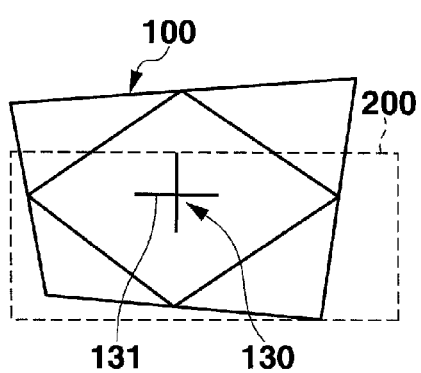

The adjustment puts the relationship between the screen 200 and the projected adjustment chart 100, which has been originally in the state illustrated in FIG. 7A, in a state illustrated in FIG. 7B.

In other words, an adjustment is made such that the horizontal line 131 of the cross mark 130 of the adjustment chart 100 becomes horizontal.

The adjustment amount of the rotation adjustment may be calculated based on the angles formed by the horizontal line 131 of the cross mark 130 and the top and bottom sides of the screen 200, or may be calculated based on the output of the posture sensor 29 assuming that the screen is placed with the top and bottom sides thereof horizontal.

In Step S203, the projection adjustment unit 40 causes the position/posture adjustment unit 56 to oscillate (change direction) in the left and right direction based on the adjustment amount calculated in Step S201.

In other words, a rotation shaft of the motor-driven leg unit 58 is rotated to rotate the projector 1 in the left and right direction (make a yaw adjustment).

Figure 7C:
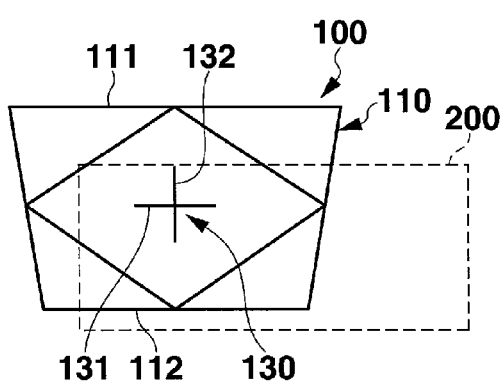

The adjustment puts the relationship between the screen 200 and the projected adjustment chart 100, which has been in the state illustrated in FIG. 7B, in a state illustrated in FIG. 7C.

In other words, the top side line 111 and the bottom side line 112 of the outer frame 110 of the adjustment chart 100 become horizontal, and the vertical line 132 of the cross mark 130 becomes perpendicular to the horizontal line 131.

In Step S204, the projection adjustment unit 40 causes the position/posture adjustment unit 56 to move parallel in the left and right direction based on the adjustment amount calculated in Step S201.

In other words, the wheel of the motor-driven leg unit 58 is driven to move the projector 1 parallel in the left and right direction.

Figure 7D:
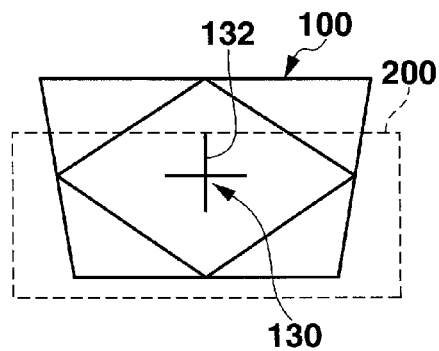

The adjustment puts the relationship between the screen 200 and the projected adjustment chart 100, which has been in the state illustrated in FIG. 7C, in a state illustrated in FIG. 7D.

In other words, the vertical line 132 of the cross mark 130 of the adjustment chart 100 is located at the center in the left and right direction of the screen 200.

In Step S205, the projection adjustment unit 40 causes the position/posture adjustment unit 56 to oscillate in the up and down direction based on the adjustment amount calculated in Step S201.

In other words, the rotation shaft of the motor-driven leg unit 58 is rotated to rotate the projector 1 in the up and down direction (make a pitch (tilt) adjustment).

Figure 7E:
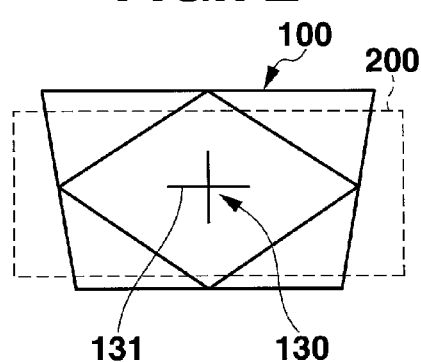

The adjustment puts the relationship between the screen 200 and the projected adjustment chart 100, which has been in the state illustrated in FIG. 7D, in a state illustrated in FIG. 7E.

In other words, the horizontal line 131 of the cross mark 130 of the adjustment chart 100 is located in the vicinity of the center in the up and down direction of the screen 200.

More accurately, as illustrated in FIG. 7E, if the top side line 111 is longer than the bottom side line 112, in other words, if the projector 1 looks up the screen 200 from below, the horizontal line 131 is located above the center in the up and down direction of the screen 200.

In Step S206, the projection adjustment unit 40 causes the lens adjustment unit 54 to adjust the zoom mechanism based on the adjustment amount calculated in Step S201.

Figure 7F:
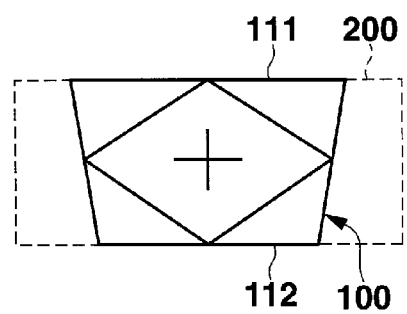

The adjustment puts the relationship between the screen 200 and the projected adjustment chart 100, which has been in the state illustrated in FIG. 7E, in a state illustrated in FIG. 7F.

In other words, the top side line 111 of the outer frame 110 of the adjustment chart 100 coincides with the top side of the screen 200, and the bottom side line 112 coincides with the bottom side of the screen 200.

As described above, the zoom mechanism of the projection lens 20 makes it possible to change the size of the projected image, and the motor-driven leg unit 58 makes it possible to adjust the position and posture of the projector 1.

In Step S207, the projection adjustment unit 40 causes the chart generation unit 41 to make a correction through the geometric correction based on the adjustment amount calculated in Step S201.

Figure 7G:
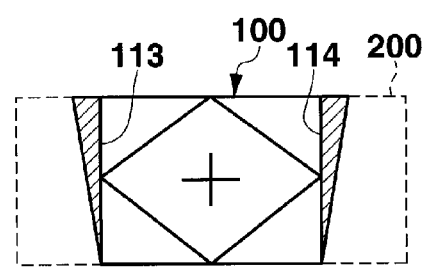

The correction puts the relationship between the screen 200 and the projected adjustment chart 100, which has been in the state illustrated in FIG. 7F, in a state illustrated in FIG. 7G.

In other words, the left side line 113 and the right side line 114 of the outer frame 110 of the adjustment chart 100 become parallel to the left and right sides of the screen 200.

Images filled with black are projected in diagonally hatched areas in FIG. 7G.

In other words, a rectangular projection area can be obtained by using a part of the area where the projector 1 can project.

The correction parameter determination unit 43 outputs the correction parameter used at this point to the image conversion unit 13.

In image conversion, the image conversion unit 13 performs a geometric correction using the input correction parameter.

The horizontal aspect ratio maintenance processing subsequently ends, and processing returns to the projection state adjustment processing.

In this manner, the horizontal aspect ratio maintenance processing adjusts a projection state such that the top and bottom sides of the projected image coincide with the top and bottom sides of the screen 200 and the screen 200 has margins in the left and right.

The horizontal aspect ratio maintenance processing adjusts the units of the projector 1 such that the projected image is projected optimally onto the screen 200.

In the embodiment, the description has been given of the case where a captured image is obtained once in Step S107, and all the adjustment amounts are calculated at once in Step S201 based on the captured image.

In this manner, if all the adjustment amounts are calculated from one captured image, the number of times of image capturing decreases and processing is simplified.

However, the embodiment is not limited to this, but an image may be captured after each step of Steps S202 to S207 to calculate an adjustment amount in each step.

In this case, the number of image capture processes increases but the amount of computation performed in the calculation of an adjustment amount decreases.

Moreover, in the embodiment, a geometric correction is performed in Step S207 to make an adjustment from the projection state of FIG. 7F to the projection state of FIG. 7G.

In contrast, if the motor-driven leg unit 58 can adjust the heights of the front and rear sides of the projector 1 separately, the trapezoid may be corrected not by the geometric correction, but by changing the heights of the front and rear sides of the projector 1.

Moreover, the position and posture of the projector 1 are adjusted by the motor-driven leg unit 58 in the processes in Steps S202 to S206.

If the motor-driven leg unit 58 cannot make part or all of the adjustments of the position and posture, the relevant adjustments may be compensated by the geometric correction.

For example, if the wheel cannot be moved parallel in Step S204, the adjustment for this may be made by the geometric correction.

Moreover, at this point, the projection position may be displaced to the left or right by an oscillation in the left or right direction to adjust a projection distortion caused at this point by the geometric correction.

In other words, the various combinations are conceivable for the adjustment method, but the adjustment method can be set to be selected in a predetermined method.

Moreover, the adjustment procedure described with reference to FIG. 6 is an example, and its order can be changed as appropriate.

For example, horizontality may be adjusted after verticality is adjusted.

Returning to FIG. 5, the description of the projection state adjustment processing will be continued.

After the horizontal aspect ratio maintenance processing in Step S112, processing proceeds to Step S117.

In the determination of Step S111, if the screen is determined not to be wider in width than the projected image, in other words, if the screen is determined to be longer in height than the projected image, processing proceeds to Step S113.

In Step S113, the projection adjustment unit 40 performs longitudinal aspect ratio maintenance processing.

If the longitudinal aspect ratio maintenance processing is performed, the aspect ratio of the screen 200 is different from that of the projected image, and the screen 200 is vertically oriented.

Figure 8:
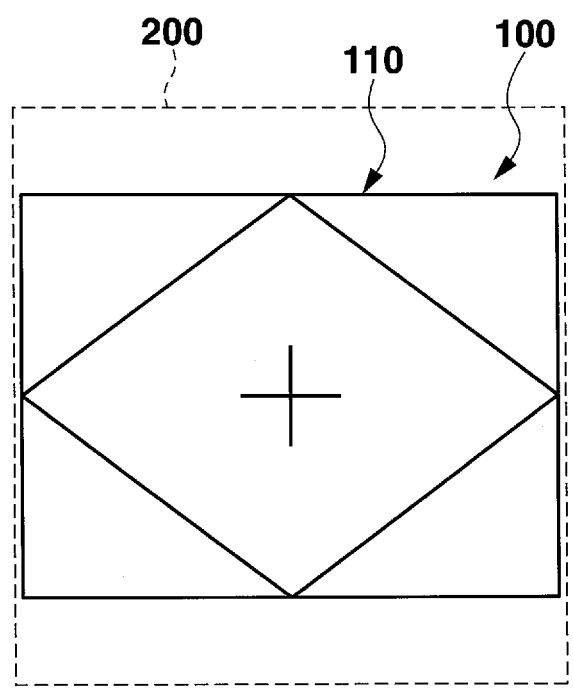
FIG. 8 is a diagram for explaining longitudinal aspect ratio maintenance processing according to the first embodiment and illustrating an example of the relationship between the screen and the adjustment chart.

Hence, in the longitudinal aspect ratio maintenance processing, the units of the projector 1 are adjusted such that the left and right sides of the outer frame 110 of the adjustment chart coincide with the left and right sides of the screen 200, and that margins are provided in the top and bottom of the screen 200, as illustrated in FIG. 8.

The basic adjustment procedure is similar to the horizontal aspect ratio maintenance processing described with reference to FIG. 6.

Processing proceeds to Step S117 after the longitudinal aspect ratio maintenance processing.

In the determination of Step S110, if it is determined not to be in the aspect ratio maintenance setting, in other words, if it is determined to be in the fitting priority setting, processing proceeds to Step S114.

In Step S114, the projection adjustment unit 40 determines whether or not the screen is wider in width than the projected image.

If it is determined to be wider in width, processing proceeds to Step S115.

In Step S115, the projection adjustment unit 40 performs horizontal fitting priority processing.

Figure 9A:
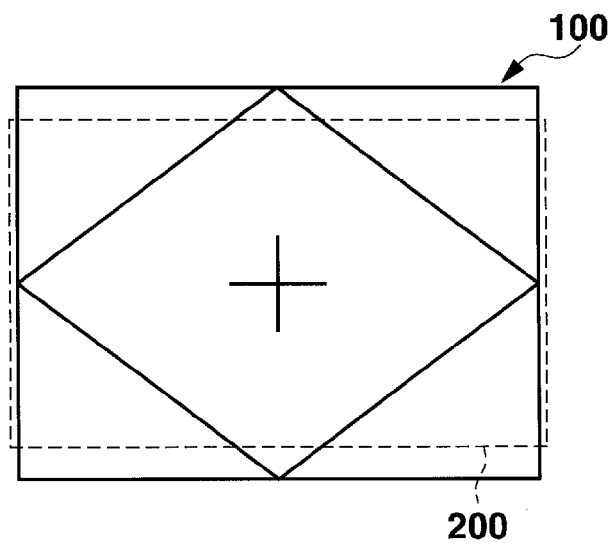
FIGS. 9A and 9B are diagrams for explaining horizontal fitting priority processing according to the first embodiment and illustrating examples of the relationship between the screen and the adjustment chart.

In the horizontal fitting priority processing, the units of the projector 1 are adjusted such that the left and right sides of the adjustment chart 100 coincide with the left and right sides of the screen 200 as illustrated in FIG. 9A.

Figure 9B:
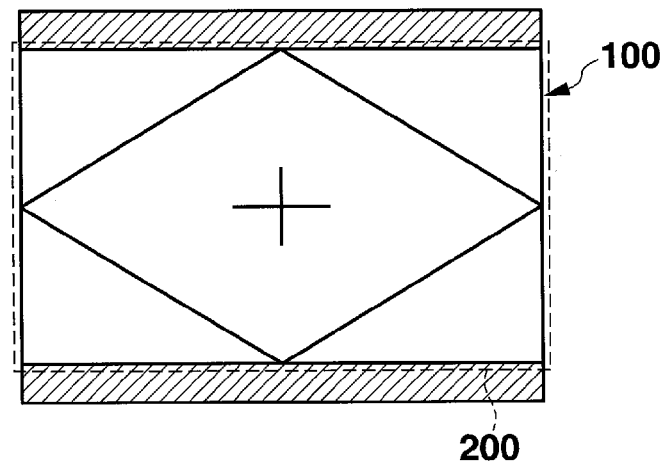

Furthermore, in the horizontal fitting priority processing, geometric correction is performed from this state to the size of the screen 200 as illustrated in FIG. 9B.

In other words, the projected image is compressed in the up and down direction.

As a result, the aspect ratio of the projected image is adjusted to the size of the screen to be horizontally oriented (is adjusted oblong).

In this manner, according to the horizontal fitting priority processing, the entire surface of the screen 200 is used as a projection plane.

Images filled with black are to be projected in diagonally hatched areas in FIG. 9B.

This means that only part of the area where the projector 1 can project is used.

In such a case of the fitting priority setting, a zoom magnification is higher than the case of the aspect ratio maintenance setting and an image is projected large. Accordingly, note that the brightness of the image relatively decreases.

Processing proceeds to Step S117 after the horizontal fitting priority processing.

In the determination of Step S114, if the screen is determined not to be wider in width than the projected image, in other words, if the screen is determined to be longer in height than the projected image, processing proceeds to Step S116.

In Step S116, the projection adjustment unit 40 performs longitudinal fitting priority processing.

Figure 10A:
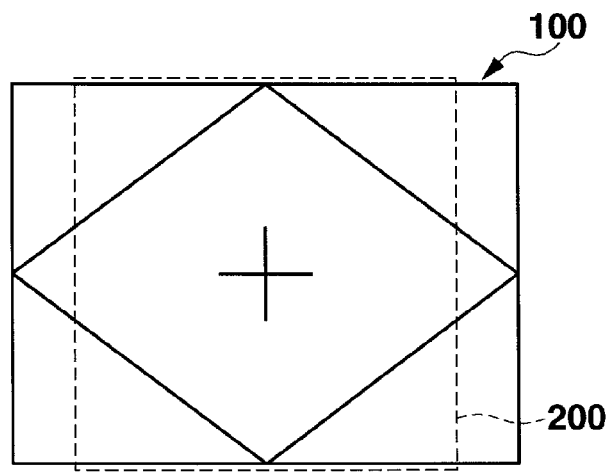
FIGS. 10A and 10B are diagrams for explaining longitudinal fitting priority processing according to the first embodiment and illustrating examples of the relationship between the screen and the adjustment chart.

In the longitudinal fitting priority processing, the units of the projector 1 are adjusted such that the top and bottom sides of the adjustment chart 100 coincide with the top and bottom sides of the screen 200 as illustrated in FIG. 10A.

Figure 10B:
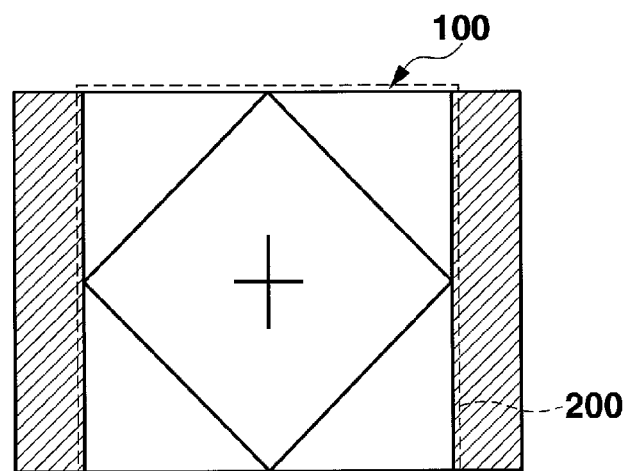

Furthermore, in the longitudinal fitting priority processing, geometric correction is performed from this state to the size of the screen 200 as illustrated in FIG. 10B.

In other words, the projected image is compressed in the left and right direction.

As a result, the aspect ratio of the projected image is adjusted to the size of the screen to be vertically oriented (is longwise adjusted).

In this manner, according to the longitudinal fitting priority processing, the entire surface of the screen 200 is used as the projection plane.

Images filled with black are to be projected in diagonally hatched areas in FIG. 10B.

This means that only part of the area where the projector 1 can project is used.

Also in the case of the longitudinal fitting priority setting, the zoom magnification is higher than the case of the aspect ratio maintenance setting and an image is projected large. Accordingly, note that the brightness of the image relatively decreases.

Processing proceeds to Step S117 after the longitudinal fitting priority processing.

In Step S117, the projection adjustment unit 40 turns off the image capturing unit 52.

Processing subsequently proceeds to Step S121.

The processes of Steps S104 to S117 enable the projector 1 to automatically achieve an optimal projection state without the user's operation.

On the other hand, if the automatic adjustment function is determined not to be on in Step S103, processing proceeds to Step S118.

When processing proceeds to Step S118, the user manually adjusts the projection state.

In other words, the adjustments made in Steps S104 to S117 are manually made by the user.

The adjustment method is similar to the above description, and the focus adjustment by the user's visual confirmation, and the adjustments of the position and posture of the projector 1 and a zoom that have been described with reference to, for example, FIGS. 7A to 7G are made.

In Step S118, the projection adjustment unit 40 determines whether or not an instruction that the user's manual adjustments are complete has been input.

When the adjustments are not complete, processing repeats Steps S118, and waits.

On the other hand, if it is determined that the completion of the adjustments has been input, processing proceeds to Step S119.

In Step S119, the projection adjustment unit 40 determines whether or not geometric correction has been requested.

If geometric correction has not been requested, processing proceeds to Step S121.

On the other hand, if geometric correction has been requested, processing proceeds to Step S120.

In Step S120, the projection adjustment unit 40 performs geometric correction processing.

In the geometric correction processing, the image capturing unit 52 captures a projection state, the correction parameter determination unit 43 calculates a geometric correction amount based on the captured image, and performs geometric correction.

Processing subsequently proceeds to Step S121.

In Step S121, the projection adjustment unit 40 ends the projection of the adjustment chart.

The projection state adjustment processing subsequently ends.

According to the embodiment, the position and posture of the projector 1 can be adjusted so as to obtain an optimal projection state.

At this point, the adjustment chart illustrated in FIG. 2 is used to enable the calculation of the adjustment amounts of the units of the projector 1 with one image capture.

The adjustment chart is not limited to the one illustrated in FIG. 2.

For example, the adjustment chart may be those illustrated in FIGS. 11A to 11H.

In these diagrams, the outer frame is indicated by a broken line.

As illustrated in these diagrams, each side of the outer frame indicated by the broken line has at least one intersection with a line indicated by a solid line.

The intersection is referred to as a first point.

In FIGS. 2, 11A, 11B, 11C, 11G, and 11H, one first point is provided to each side.

Figure 11A:
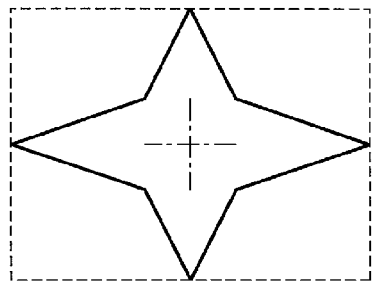
FIGS. 11A to 11H are diagrams illustrating other examples of the adjustment chart according to the first embodiment.
Figure 11B:
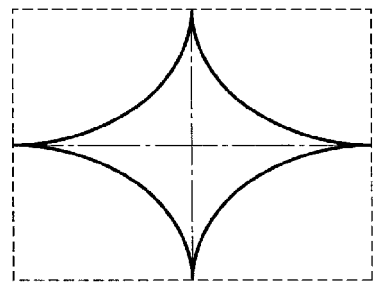
Figure 11C:
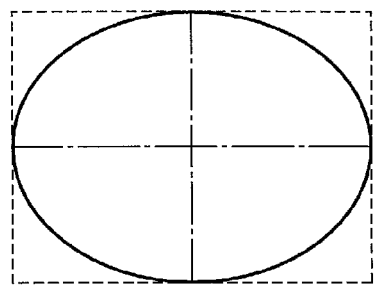
Figure 11D:
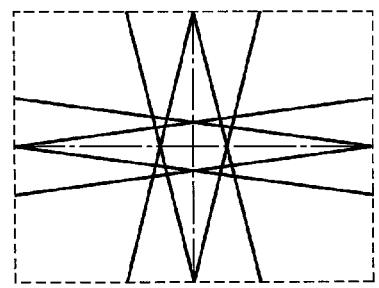
Figure 11E:
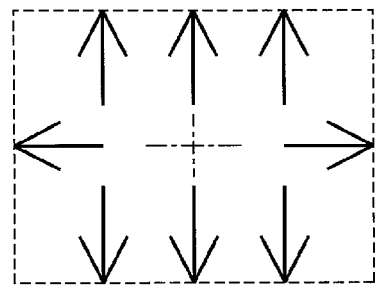

Moreover, in FIG. 11E, three first points are provided to each of the top and bottom sides, and one first point is provided to each of the left and right sides.

Figure 11F:
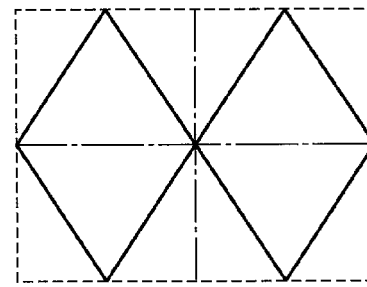
Figure 11G:
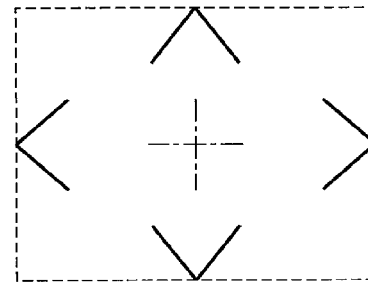

Moreover, in FIG. 11F, two first points are provided to each of the top and bottom sides, and one first point is provided to each of the left and right sides.

The first point is provided with at least two lines having the first point at one of their ends.

In FIGS. 2, 11A, 11B, 11C, 11F, 11G, and 11H, each first point is provided with two lines having the first point at one of their ends.

In FIG. 11E, each first point is provided with three lines having the first point at one of their ends.

These lines are referred to as first lines.

In FIGS. 2, 11A, 11D, 11E, 11F, 11G, and 11H, the first line is a straight line.

In FIGS. 11B and 11C, the first line is a curved line.

Figure 11H:
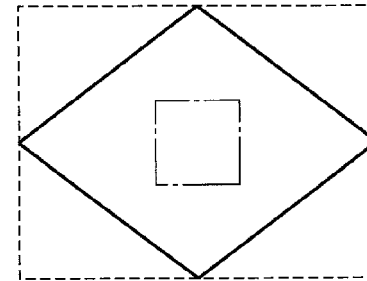

In FIGS. 2 and 11H, the first lines form a rhombus.

In FIG. 11C, the first lines form (arcs each forming a part of) an ellipse.

According to the first line, even if the outer frame is not projected on the screen, the position of the outer frame becomes clear (is estimated easily).

The outer frame is further provided to the adjustment chart. Accordingly, when the contour is projected on the screen, the contour can be easily recognized.

Moreover, the horizontality and verticality of a projected image become clear with horizontal and vertical lines such as a cross line indicated by a dot and dash line.

The lines indicating horizontality and verticality are not limited to the cross shape but may be, for example, a rectangle or square as illustrated in FIG. 11H.

The adjustment chart having the features illustrated in FIGS. 11A to 11H can obtain similar effects to those of the embodiment.

The adjustment charts illustrated in FIGS. 2 and 11A to 11H are examples. If the adjustment chart includes the first points, each having at least two first lines with the first point at one of their ends, similar effects can be obtained.

Second Embodiment

Next, a second embodiment will be described.

Different points from the first embodiment will be described here. The same reference numerals are assigned to the same portions and their descriptions will be omitted.

In the embodiment, a plurality of projectors 310 is used.

Figure 12:
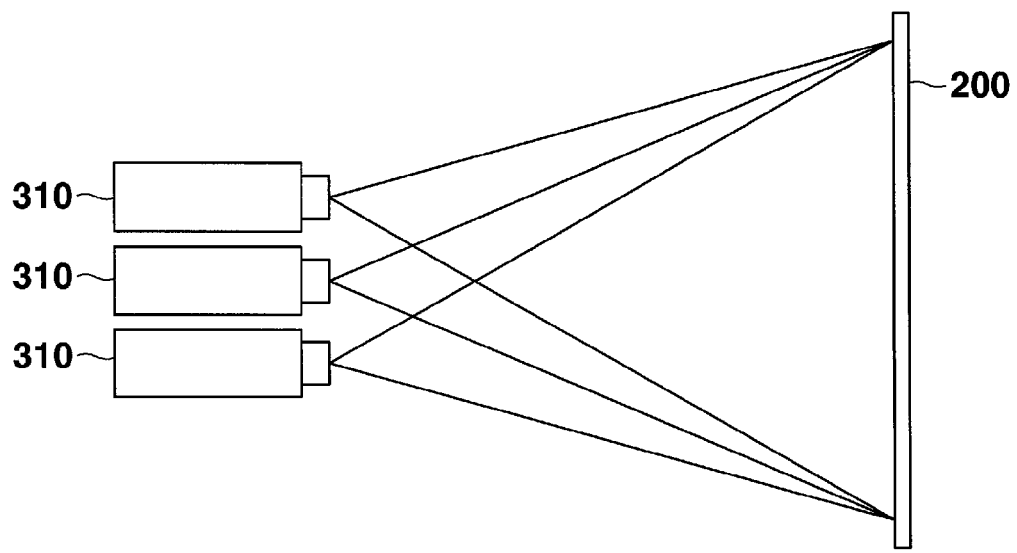
FIG. 12 is a diagram for explaining a relationship between projectors and projected images according to a second embodiment.

For example, as illustrated in FIG. 12, the plurality of projectors 310 projects images in the same area on the screen 200.

In this manner, the plurality of projectors 310 projects images in the same area and accordingly high projection brightness that cannot be obtained by one projector can be obtained.

Such a projection methods is also called stack projection.

Figure 13:
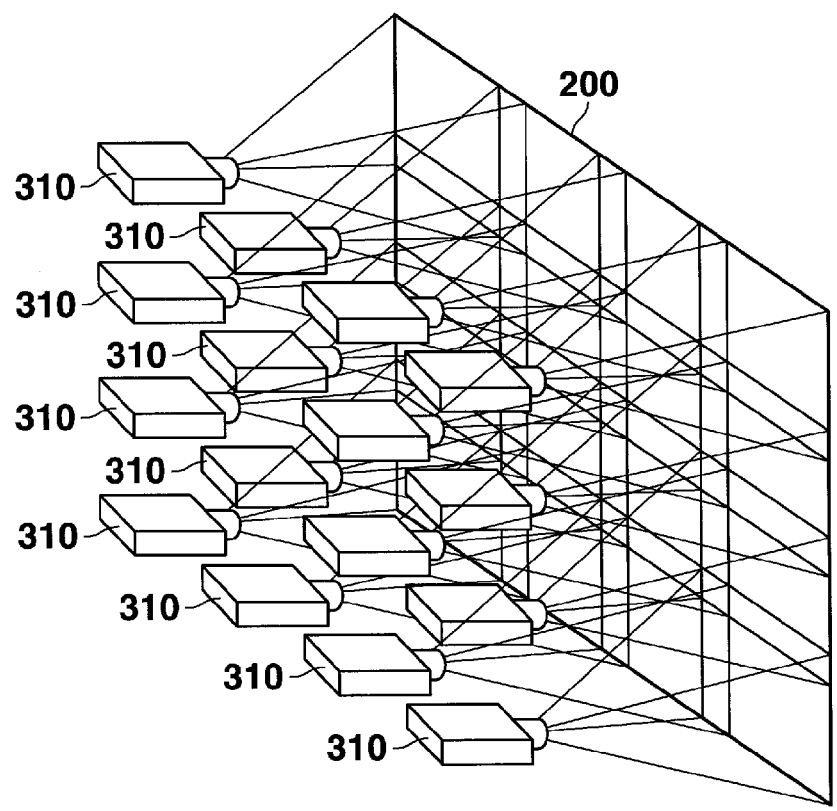
FIG. 13 is a diagram for explaining a relationship between the projectors and projected images according to the second embodiment.

Moreover, for example, as illustrated in FIG. 13, the projectors 310 project images, respectively, in different areas on the screen 200. The plurality of projectors 310 forms one image.

In this manner, one image is formed by the plurality of projectors 310 and accordingly it is possible to obtain a large image that cannot be obtained by one projector with high brightness and high resolution.

Such a projection method is also called tiling projection.

Figure 14:
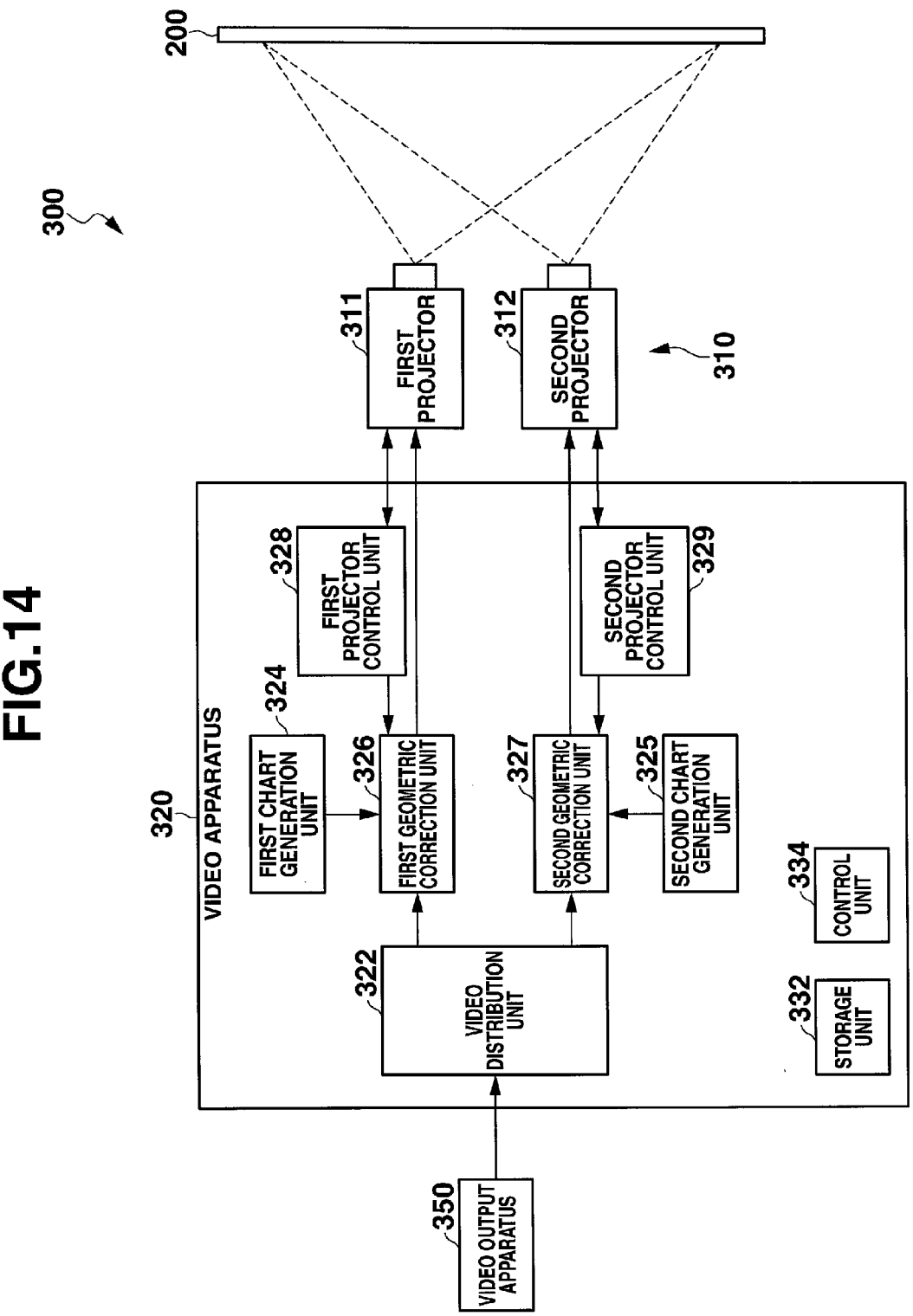
FIG. 14 is a block diagram illustrating an exemplary configuration of a projection system according to the second embodiment.

In this manner, an exemplary configuration of a projection system 300 including the plurality of projectors 310 is schematically illustrated in FIG. 14.

FIG. 14 is a diagram illustrating a case where there are two projectors 310 as an example. However, the number of the projectors 310 can be any number and the contents described below can be applied similarly.

As illustrated in FIG. 14, the projection system 300 includes a first projector 311 and a second projector 312.

Moreover, the projection system 300 includes a video apparatus 320 (a projection control apparatus).

An image signal (video signal) is input to the projection system 300 from a video output apparatus 350.

The video output apparatus 350 can be any apparatus as long as it outputs an image to project onto the screen 200 and outputs an image signal.

For example, a PC or a video player can be used as the video output apparatus 350.

The video output apparatus 350 outputs a video signal to the video apparatus 320.

The video apparatus 320 includes a video distribution unit 322, a first chart generation unit 324, a second chart generation unit 325, a first geometric correction unit 326, and a second geometric correction unit 327.

The video distribution unit 322 acquires the image signal output from the video output apparatus 350, and distributes the image signal into the number of the projectors 310, in other words, two in this example.

One of the distributed image signals is input into the first geometric correction unit 326, and the other is input into the second geometric correction unit 327.

The first chart generation unit 324 and the second chart generation unit 325 output adjustment charts similar to those used in the first embodiment, for example, those illustrated in FIGS. 2 and 11A to 11H.

Information on the adjustment charts is stored in a storage unit 332 included in the video apparatus 320.

A first adjustment chart output from the first chart generation unit 324 and a second adjustment chart output from the second chart generation unit 325 are, for example, the same in shape but different in color.

The first adjustment chart output from the first chart generation unit 324 is input into the first geometric correction unit 326. The second adjustment chart output from the second chart generation unit 325 is input into the second geometric correction unit 327.

The first geometric correction unit 326 and the second geometric correction unit 327 perform geometric correction on projected images such that the images to be projected onto the screen 200 become appropriate rectangles, similarly to those performed by the correction parameter determination unit 43 and the image conversion unit 13 in the first embodiment.

The video apparatus 320 is connected to the first projector 311 and the second projector 312 by, for example, RGB/HDMI video terminals.

The image signal on which geometric correction has been performed by the first geometric correction unit 326 is transmitted to the first projector 311. The image signal on which geometric correction has been performed by the second geometric correction unit 327 is transmitted to the second projector 312.

Moreover, the video apparatus 320 is connected to the first projector 311 and the second projector 312 by, for example, RS232C or USB communication cables. The video apparatus 320 transmits a control signal to the first projector 311 and the second projector 312.

Hence, the video apparatus 320 includes a first projector control unit 328 that transmits the control signal to the first projector 311, and a second projector control unit 329 that transmits the control signal to the second projector 312.

Moreover, the video apparatus 320 includes a control unit 334 that controls the units of the video apparatus 320.

The control unit 334 also exerts functions similar to the adjustment value calculation unit 42 and the correction parameter determination unit 43 according to the first embodiment.

Moreover, as also described in the first embodiment, if the adjustments are made automatically, projected images captured by image capturing units of the first projector 311 and the second projector 312 are acquired by the communication cables, and the information is passed to the first geometric correction unit 326 and the second geometric correction unit 327 to perform appropriate geometric correction.

The turning on/off and the like of the video apparatus 320, and the first projector 311 and the second projector 312 may be set to be synchronous.

In other words, it can be set such that when the video apparatus 320 is turned on, the first projector 311 and the second projector 312 are simultaneously turned on.

Similarly, the switching of video of the first projector 311 and the second projector 312, and the like can be performed in common by the video apparatus 320.

In this manner, a plurality of projectors is simultaneously controlled by the video apparatus 320 and accordingly it becomes easier for the user to operate the entire projection system 300.

Moreover, if a plurality of projectors is placed on the ceiling or the like, a remote control that uses infrared light, or the like is used for their operations.

On the other hand, the infrared light or the like emitted from the remote control is not guaranteed to reach the plurality of projectors simultaneously.

Therefore, also in this case, the simultaneous control of the plurality of projectors by the video apparatus 320 takes effects.

The first projector 311 and the second projector 312 are similar projectors to the projector 1 according to the first embodiment, and project images onto a projection target, for example, the screen 200 based on input image signals.

In the embodiment, the function of the projection adjustment unit 40 in the first embodiment is carried out by the video apparatus 320.

Next, projection state adjustment processing according to the embodiment will be described.

The projection state adjustment processing according to the embodiment will also be performed similarly to the projection state adjustment processing according to the first embodiment.

However, in the embodiment, there are two projectors 310 and accordingly adjustments are made for the positions and postures of the two projectors.

The adjustments of the positions and postures of the projectors according to the embodiment and stack projection adjustment processing related to superimposition of projected images of the plurality of projectors will be described with reference to the flowchart illustrated in FIG. 15 and schematic diagrams illustrated in FIGS. 16A to 16F.

In Step S301, the video apparatus 320 calculates the adjustment amounts of the positions and postures of the first projector 311 and the second projector 312 based on a captured image that has captured the screen 200 and projected images of the first projector 311 and the second projector 312.

Figure 16A:
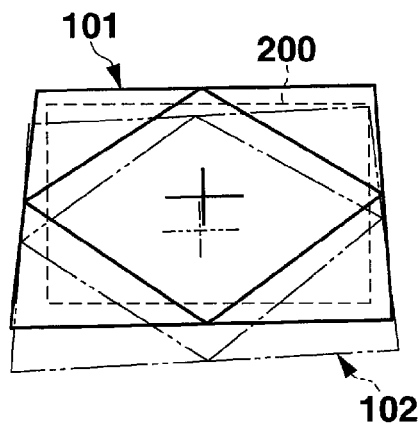
FIGS. 16A to 16F are diagrams for explaining the stack projection adjustment processing according to the second embodiment and illustrating examples of a relationship between a screen and an adjustment chart depending on the position and posture of the projector.

It is assumed here that the positional relationship between the screen 200 and the projected images of the first projector 311 and the second projector 312 are, for example, as illustrated in FIG. 16A.

In FIG. 16A, the screen 200 is represented by a broken line, a first adjustment chart 101 projected by the first projector 311 by a solid line, and a second adjustment chart 102 projected by the second projector 312 by a chain double dashed line.

The same shall also apply hereinafter in FIGS. 16B to 16F.

The first adjustment chart 101 and the second adjustment chart 102 are different in, for example, color and can be distinguished.

In Step S302, the video apparatus 320 causes the position/posture adjustment unit 56 of the first projector 311 to make a rotation adjustment based on the adjustment amount calculated in Step S301.

In Step S303, the video apparatus 320 causes the position/posture adjustment unit 56 of the first projector 311 to oscillate in the left and right direction based on the adjustment amount calculated in Step S301.

In Step S304, the video apparatus 320 causes the position/posture adjustment unit 56 of the first projector 311 to move parallel in the left and right direction based on the adjustment amount calculated in Step S301.

In Step S305, the video apparatus 320 causes the position/posture adjustment unit 56 of the second projector 312 to make a rotation adjustment based on the adjustment amount calculated in Step S301.

In Step S306, the video apparatus 320 causes the position/posture adjustment unit 56 of the second projector 312 to oscillate in the left and right direction based on the adjustment amount calculated in Step S301.

In Step S307, the video apparatus 320 causes the position/posture adjustment unit 56 of the second projector 312 to move parallel in the left and right direction based on the adjustment amount calculated in Step S301.

Figure 16B:
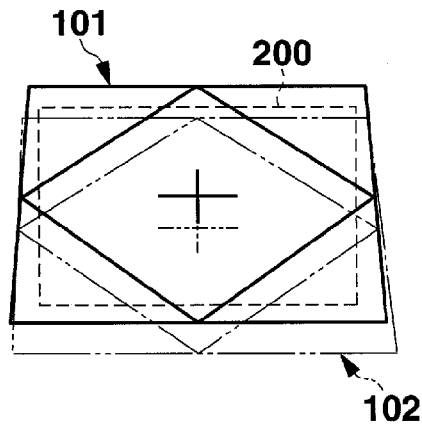

The adjustments of Steps S302 to S307 put the relationship between the screen 200 and the projected first adjustment chart 101 and second adjustment chart 102, which has been originally in the state illustrated in FIG. 16A, in a state illustrated in FIG. 16B.

In other words, the horizontal lines of the cross marks of the first adjustment chart 101 and the second adjustment chart 102 become horizontal, the top and bottom side lines of the outer frames become parallel, the vertical lines of the cross marks become vertical, and the vertical lines of the cross marks are located at the center in the left and right direction of the screen 200.

In Step S308, the video apparatus 320 ends the projection by the second projector 312.

Figure 16C:
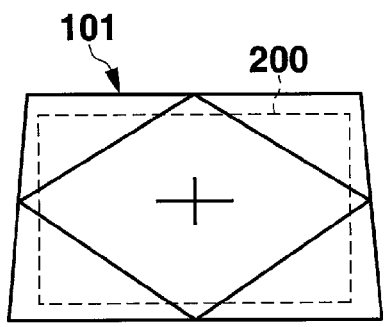

As a result, the relationship between the screen 200 and the projected adjustment charts, which has been in the state illustrated in FIG. 16B, falls in a state illustrated in FIG. 16C.

In other words, it falls in a state where only the first adjustment chart 101 is being projected.

In Step S309, the video apparatus 320 causes the position/posture adjustment unit 56 of the first projector 311 to oscillate in the up and down direction based on the adjustment amount calculated in Step S301.

In Step S310, the video apparatus 320 causes the lens adjustment unit 54 of the first projector 311 to make the zoom adjustment based on the adjustment amount calculated in Step S301.

Figure 16D:
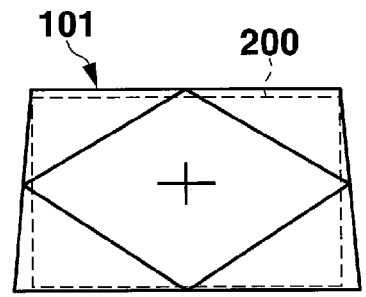

The adjustments of Steps S309 and S310 put the relationship between the screen 200 and the projected first adjustment chart 101, which has been in the state illustrated in FIG. 16C, in a state illustrated in FIG. 16D.

In other words, the horizontal line of the cross mark of the first adjustment chart 101 is located at the center in the up and down direction of the screen 200, the top side line of the outer frame of the first adjustment chart 101 coincides with the top side of the screen 200, and the bottom side line of the outer frame coincides with the bottom side of the screen 200.

In Step S311, the video apparatus 320 resumes the projection by the second projector 312.

Figure 16E:
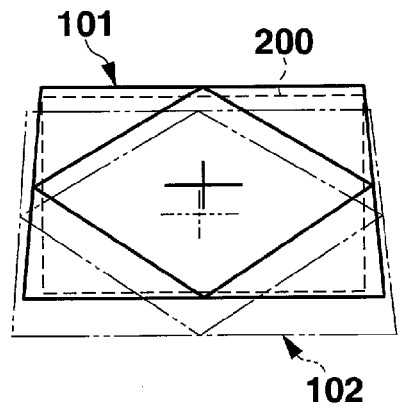

As a result, the relationship between the screen 200 and the projected adjustment chart, which has been in the state illustrated in FIG. 16D, falls in a state illustrated in FIG. 16E.

In Step S312, the video apparatus 320 causes the position/posture adjustment unit 56 of the second projector 312 to oscillate in the up and down direction based on the adjustment amount calculated in Step S301.

In Step S313, the video apparatus 320 causes the lens adjustment unit 54 of the second projector 312 to make the zoom adjustment based on the adjustment amount calculated in Step S301.

Figure 16F:
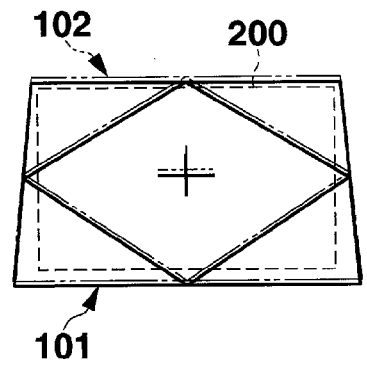

The adjustments of Steps S312 and S313 put the relationship between the screen 200 and the projected adjustment charts, which has been in the state illustrated in FIG. 16E, in a state illustrated in FIG. 16F.

In other words, the horizontal line of the cross mark of the second adjustment chart 102 is located at the center in the up and down direction of the screen 200, the top side line of the outer frame of the second adjustment chart 102 coincides with the top side of the screen 200, and the bottom side line of the outer frame coincides with the bottom side of the screen 200.

As a result, the first adjustment chart 101 and the second adjustment chart 102 overlap each other.

In Step S314, the video apparatus 320 causes the geometric correction unit to perform geometric correction based on the adjustment amount calculated in Step S301.

The adjustment enables projections by the first projector 311 and the second projector 312 on the screen 200 to be appropriately adjusted.

The stack projection adjustment processing subsequently ends, and processing returns to the projection state adjustment processing.

In this manner, similarly to the first embodiment, the stack projection adjustment processing appropriately adjusts projections by the first projector 311 and the second projector 312 on the screen 200 and accurately superimposes the projections by the first projector 311 and the second projector 312 on the screen 200.

In this manner, the embodiment can obtain similar effects to the first embodiment also in stack projection.

Moreover, the operation is also similar in tiling projection illustrated in FIG. 13 and similar effects can be obtained.

Figure 15:
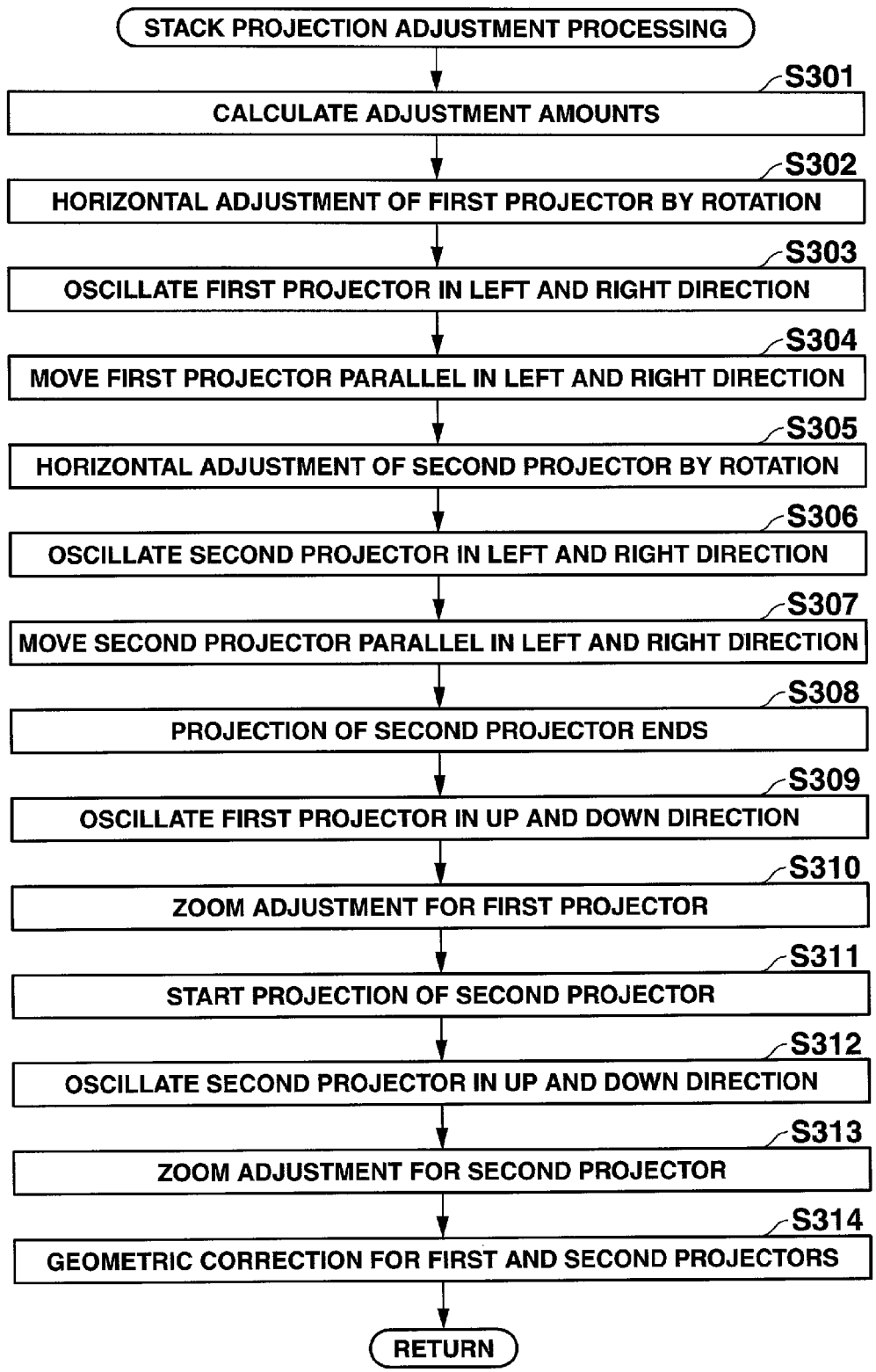
FIG. 15 is a flowchart illustrating an example of stack projection adjustment processing according to the second embodiment.

In FIG. 15, the projection by the second projector 312 is resumed in Step S311. However, at this point, the projection by the first projector 311 may be ended.

Moreover, at the time of the adjustments of Steps S302 to S304, the projection by the second projector 312 may not be performed.

Third Embodiment

Next, a third embodiment will be described.

Different points from the first embodiment will be described here. The same reference numerals are assigned to the same portions and their descriptions will be omitted.

In the embodiment, a case where a projection state is adjusted by the geometric correction will be considered.

In the embodiment, a user performs geometric correction using, for example, an arrow key.

The configuration of the projector 1 according to the embodiment is similar to that of the first embodiment described with reference to FIG. 1.

However, the position/posture adjustment unit 56 and the motor-driven leg unit 58 may not be included.

Examples of projected images and an operation method according to the embodiment will be described with reference to FIGS. 17A to 17I.

In FIGS. 17A to 17I, a broken line represents the screen 200, and a solid line represents an adjustment chart 500 according to the embodiment.

Figure 17A:
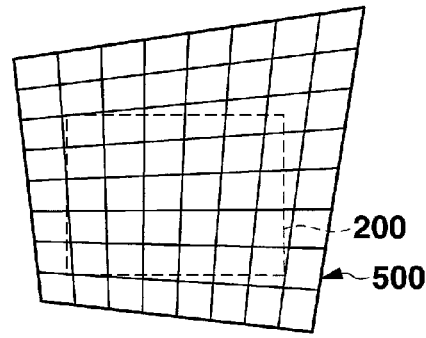
FIGS. 17A to 17I are diagrams for explaining geometric correction according to a third embodiment and illustrating examples of a relationship between a screen and an adjustment chart.

It is assumed that, before adjustments of a projection state, the positional relationship between the screen 200 and the adjustment chart 500 is as in, for example, FIG. 17A.

The contour of the adjustment chart 500 illustrated in FIG. 17A is an area where the projector 1 can project.

First, an adjustment is made for the top left corner in a projection area.

Figure 17B:
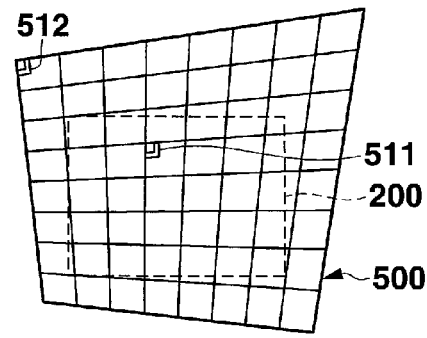

At this point, as illustrated in FIG. 17B, the adjustment chart 500 includes a first correction position guide mark 511 indicating an adjustment for the top left corner, and a first correction position mark 512 indicating the position of the top left corner.

It is conceivable here that the first correction position mark 512 also serves as the first correction position guide mark indicating an adjustment for the top left corner. However, if the projection position of the first correction position mark 512 is outside the screen 200, a user may not be able to recognize the existence of the first correction position mark 512.

Hence, the adjustment chart 500 according to the embodiment includes the first correction position guide mark 511 indicating an adjustment for the top left corner in the vicinity of the center of the adjustment chart 500.

In the adjustment for the top left corner in the projection area, the user operates, for example, the arrow key.

In response to the operation, the chart generation unit 41 performs a geometric correction on the adjustment chart to be projected and moves the position of the top left corner.

Figure 17C:
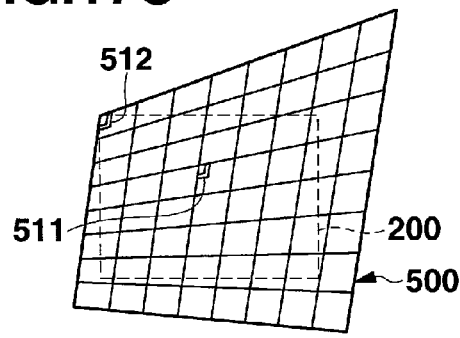

In this manner, the adjustment chart 500 to be projected is adjusted, for example, as illustrated in FIG. 17C.

At this point, an image area where the adjustment chart 500 is being projected is smaller than (is located inward of) the contour of the adjustment chart 500 illustrated in FIG. 17A, the contour being the projectable area of the projector 1.

In other words, an image area is part of the projectable area, and the area outside the image area and in the projectable area is not used for the projection of an image (a black image is projected).

The same shall apply hereinafter.

Next, an adjustment is made for the top right corner in the projection area.

Figure 17D:
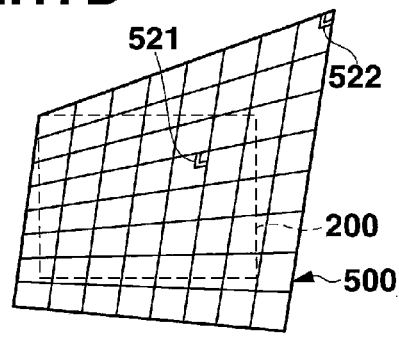

At this point, as illustrated in FIG. 17D, the adjustment chart 500 includes a second correction position guide mark 521 indicating an adjustment for the top right corner, and a second correction position mark 522 indicating the position of the top right corner.

In the adjustment for the top right corner in the projection area, the user operates, for example, the arrow key.

In response to the operation, the chart generation unit 41 performs a geometric correction on the adjustment chart to be projected and moves the position of the top right corner.

Figure 17E:
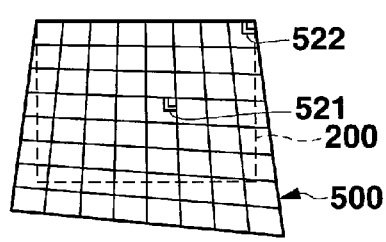

In this manner, the adjustment chart 500 to be projected is adjusted, for example, as illustrated in FIG. 17E.

Next, an adjustment is made for the bottom left corner in the projection area.

Figure 17F:
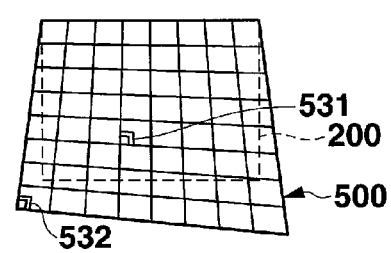

At this point, as illustrated in FIG. 17F, the adjustment chart 500 includes a third correction position guide mark 531 indicating an adjustment for the bottom left corner, and a third correction position mark 532 indicating the position of the bottom left corner.

In the adjustment for the bottom left corner in the projection area, the user operates, for example, the arrow key.

In response to the operation, the chart generation unit 41 performs a geometric correction on the adjustment chart to be projected and moves the position of the bottom left corner.

Figure 17G:
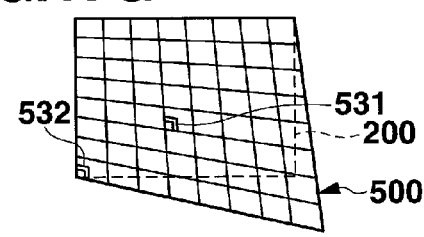

In this manner, the adjustment chart 500 to be projected is adjusted, for example, as illustrated in FIG. 17G.

Next, an adjustment is made for the bottom right corner in the projection area.

Figure 17H:
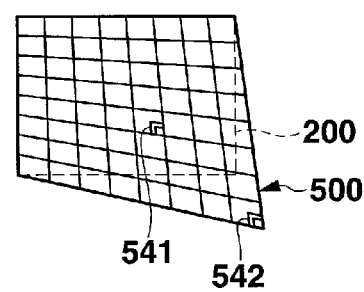

At this point, as illustrated in FIG. 17H, the adjustment chart 500 includes a fourth correction position guide mark 541 indicating an adjustment for the bottom right corner, and a fourth correction position mark 542 indicating the position of the bottom right corner.

In the adjustment for the bottom right corner in the projection area, the user operates, for example, the arrow key.

In response to the operation, the chart generation unit 41 performs a geometric correction on the adjustment chart to be projected and moves the position of the bottom right corner.

Figure 17I:
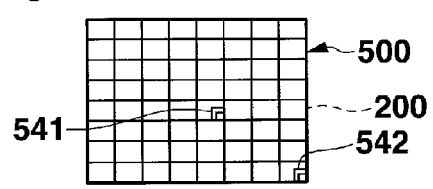

In this manner, the adjustment chart 500 to be projected is adjusted, for example, as illustrated in FIG. 17I.

In this manner, according to the embodiment, the first correction position guide mark 511, the second correction position guide mark 521, the third correction position guide mark 531, and the fourth correction position guide mark 541 are displayed in the vicinity of the center of the adjustment chart 500. Therefore, there is little risk that these guide marks are projected outside the screen.

Therefore, the user can always visually confirm these guide marks.

As a result, the user can easily recognize which corner he/she is making a correction for at the moment.

Figure 18A:
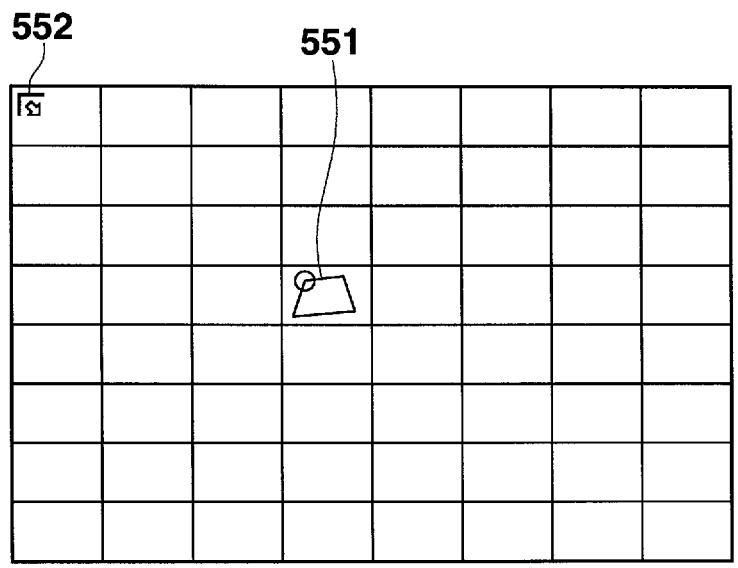
FIGS. 18A and 18B are diagrams illustrating other examples of the adjustment chart according to the third embodiment.
Figure 18B:
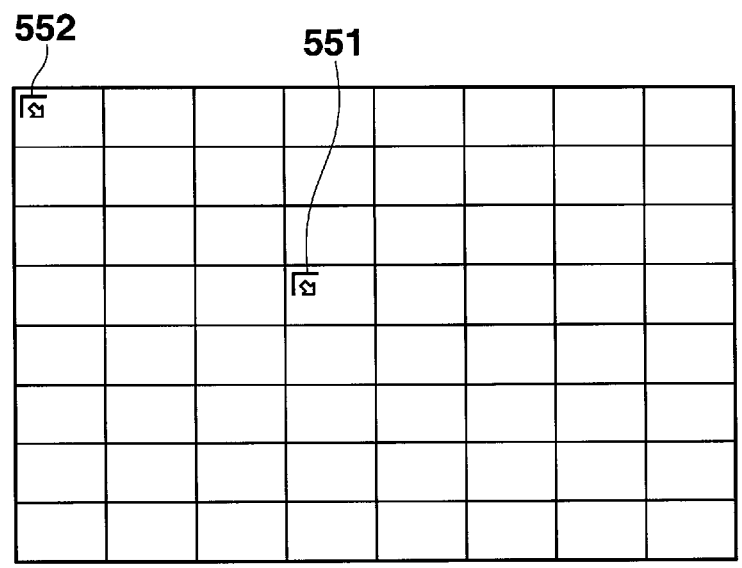

The correction position guide mark and the correction position mark can be any mark, and may be, for example, a correction position guide mark 551 and a correction position mark 552 illustrated in FIGS. 18A and 18B.

Fourth Embodiment

Next, a fourth embodiment will be described.

Different points from the third embodiment will be described here. The same reference numerals are assigned to the same portions and their descriptions will be omitted.

The third embodiment illustrates the example where the user manually adjusts the image area using the arrow key and the like.

In contrast, the projection adjustment unit 40 of the projector 1 adjusts the image area in the embodiment.

Figure 19:
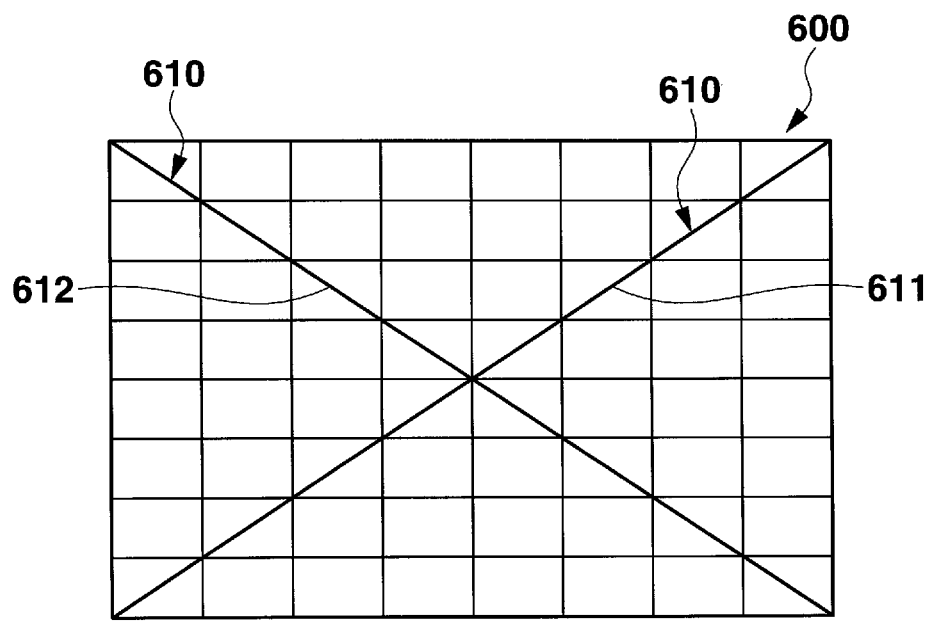
FIG. 19 is a diagram illustrating an example of an adjustment chart according to a fourth embodiment.

FIG. 19 is a diagram illustrating an example of an adjustment chart according to the embodiment.

As illustrated in the diagram, an adjustment chart 600 according to the embodiment includes cross lines 610 representing diagonals of an image.

Of the cross lines 610, a diagonal linking the top right corner and the bottom left corner is referred to as a first cross line 611, and a diagonal linking the top left corner and the bottom right corner is referred to as a second cross line 612.

The use of the cross lines 610 makes it possible to obtain a correction method appropriate to locate the four vertices of the image area on the diagonals of the screen.

The description will be given with reference to FIGS. 20A, 20B, 21A, and 21B.

Figure 20A:
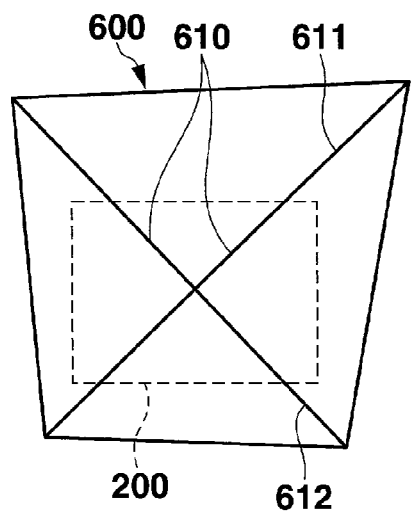
FIGS. 20A and 20B are diagrams for explaining geometric correction according to the fourth embodiment and illustrating examples of a relationship between a screen and an adjustment chart.

FIG. 20A is a diagram illustrating a relationship between the position of the screen 200 before correction and the adjustment chart 600.

A solid line represents the projected adjustment chart 600 and a broken line represents the screen 200.

Figure 21A:
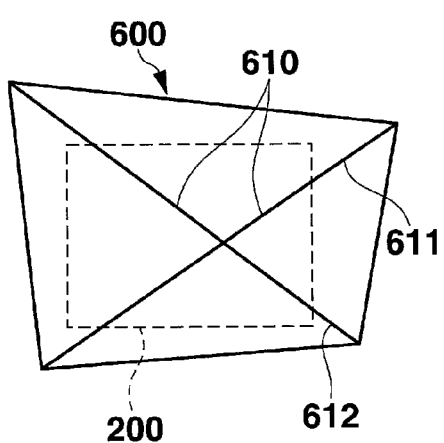
FIGS. 21A and 21B are diagrams for explaining geometric correction according to the fourth embodiment and illustrating other examples of the relationship between the screen and the adjustment chart.
Figure 21B:
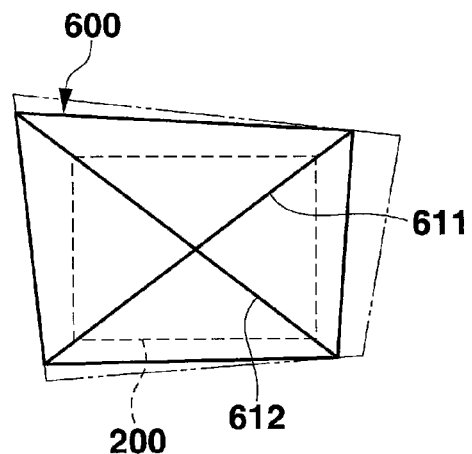

The same shall apply in FIGS. 21A and 21B.

As illustrated in FIG. 20A, the cross lines 610 of the adjustment chart 600 do not coincide with the diagonals of the screen 200 before correction.

Hence, the projection adjustment unit 40 performs geometric correction such that the cross lines 610 coincide with the diagonals of the screen 200.

The contour of the adjustment chart 600 before geometric correction coincides with a projectable area.

Here, attention is focused on, for example, the top right corner of FIG. 20A.

When the top right position of the adjustment chart 600 is transformed, it is considered to move the top right corner inward of the adjustment chart 600, in other words, leftward or downward of it.

Whether the top right corner is moved leftward or downward can be determined based on whether the first cross line 611 intersects with the top side or right side of the screen 200.

In other words, as illustrated in FIG. 20A, when the first cross line 611 intersects with the top side of the screen 200, if the top right corner is moved downward, the cross lines 610 can coincide with the diagonals of the screen 200.

Figure 20B:
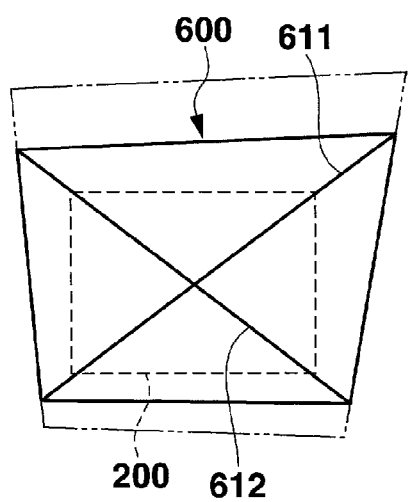

FIG. 20B is a diagram illustrating a relationship between the position of the screen 200 after the geometric correction is performed thereon such that the cross lines 610 coincide with the diagonals of the screen 200, and the adjustment chart 600.

In FIG. 20B, a dot and dash line represents the contour of the adjustment chart 600 before correction, in other words, a projectable area.

Similarly, attention is focused on the bottom right corner of FIG. 20A.

When the bottom right position of the adjustment chart 600 is transformed, whether the bottom right corner is moved leftward or upward can be determined based on whether the second cross line 612 intersects with the bottom side or right side of the screen 200.

In other words, as illustrated in FIG. 20A, when the second cross line 612 intersects with the bottom side of the screen 200, if the bottom right corner is moved upward, the cross lines 610 can coincide with the diagonals of the screen 200 as illustrated in FIG. 20B.

On the other hand, attention is focused on the top right corner. As illustrated in FIG. 21A, when the first cross line 611 intersects with the right side of the screen 200, if the top right corner is moved leftward, the cross line 610 can coincide with the diagonal of the screen 200 as illustrated in FIG. 21B.

Moreover, attention is focused on the bottom right corner. When the second cross line 612 intersects with the right side of the screen 200, if the bottom right corner is moved leftward, the cross line 610 can coincide with the diagonal of the screen 200 as illustrated in FIG. 21B.

Similarly, attention is focused on the top left corner. In order to cause the cross line 610 to coincide with the diagonal of the screen 200, the top left corner is moved downward if the second cross line 612 intersects with the top side of the screen 200, and the top left corner is moved rightward if the second cross line 612 intersects with the left side of the screen 200.

Moreover, attention is focused on the bottom left corner. In order to cause the cross line 610 to intersect with the diagonal of the screen 200, the bottom left corner is moved upward if the first cross line 611 intersects with the bottom side of the screen 200, and the bottom left corner is moved rightward if the first cross line 611 intersects with the left side of the screen 200.

As described above, geometric correction where the cross lines 610 coincide with the diagonals of the screen 200 can be performed.

After the cross lines 610 coincide with the diagonals of the screen 200, the four corners of the projection area are respectively moved inward on the cross lines 610. Accordingly, the four corners of the projection area can be aligned with the four corners of the screen 200.

The projection adjustment unit 40 according to the embodiment performs geometric correction by using the above.

Figure 22:
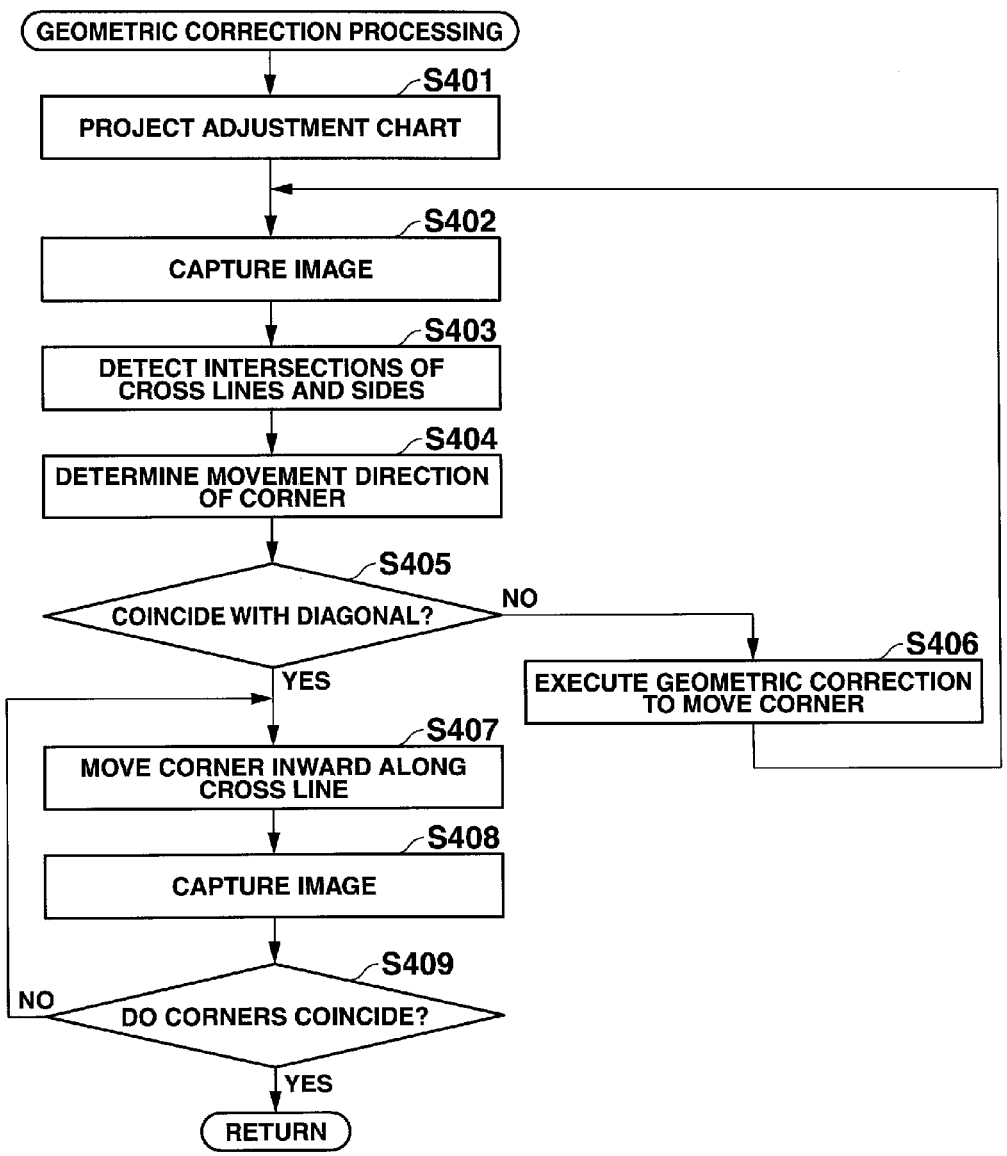
FIG. 22 is a flowchart illustrating an example of geometric correction processing according to the fourth embodiment.

The geometric correction processing according to the embodiment will be described with reference to the flowchart of FIG. 22.

In Step S401, the projection adjustment unit 40 projects the adjustment chart 600.

In Step S402, the projection adjustment unit 40 causes the image capturing unit 52 to capture a projection state and acquire the captured image.

In Step S403, the projection adjustment unit 40 detects the intersections of the cross lines 610 and the sides of the screen 200 based on the captured image.

In Step S404, the projection adjustment unit 40 determines a movement direction in geometric correction in the method described with reference to FIGS. 20A, 20B, 21A, and 21B, for each of the four corners of the image area.

If the cross line 610 coincides with the diagonal of the screen 200, it is determined that the relevant corner is not moved.

In Step S405, the projection adjustment unit 40 determines for each of the four corners whether or not the cross line 610 coincides with the diagonal of the screen 200.

If it is determined that the lines of all the corners coincide, processing proceeds to Step S407.

On the other hand, if it is determined that there is the corner whose line does not coincide, processing proceeds to Step S406.

In Step S406, the projection adjustment unit 40 performs a geometric correction that moves each of the four corners of the projection area by the geometric correction by a predetermined amount in the direction determined in Step S404.

Processing subsequently returns to Step S402.

In Step S407, the projection adjustment unit 40 performs a geometric correction that moves any of the four corners of the image area, which does not coincide with the corner of the screen 200, inward along the cross line 610 by the predetermined amount.

In other words, the four corners of the image area are gradually moved inward, respectively.

In Step S408, the projection adjustment unit 40 causes the image capturing unit 52 to capture the projection state and acquire the captured image.

In Step S409, the projection adjustment unit 40 determines whether or not the four corners of the image area coincide with the corners of the screen 200, respectively.

If all the four corners of the image area coincide with the corners of the screen 200, the geometric correction processing ends.

On the other hand, if any of the four corners does not coincide, processing returns to Step S407.

According to the geometric correction processing, geometric correction is performed by the projection adjustment unit 40 such that the image area coincides with the screen 200.

According to the embodiment, even if the contour of the adjustment chart 600 is outside the screen 200 and is not projected on the screen 200, the positions of the corners of the adjustment chart 600 are identified, and adjustments for geometric correction can efficiently be made.

In the embodiment, the projection adjustment unit 40 determines the correction amount of geometric correction. However, geometric correction may be performed in response to the user's operation as in the third embodiment.

In such a case, the user can determine the directions in which to move the corners first in accordance with how the cross lines 610 intersect with the sides of the contour of the screen 200.

After the diagonals coincide, the corners are moved inward on the cross lines 610 by the operations of appropriate keys to which the operations are assigned. Accordingly, the corners of the projection area can be easily aligned with their corresponding corners of the screen 200.

Therefore, the embodiment enables a reduction in the number of operations for adjustments for geometric correction and the shortening of time for adjustments for geometric correction.

Figure 23:
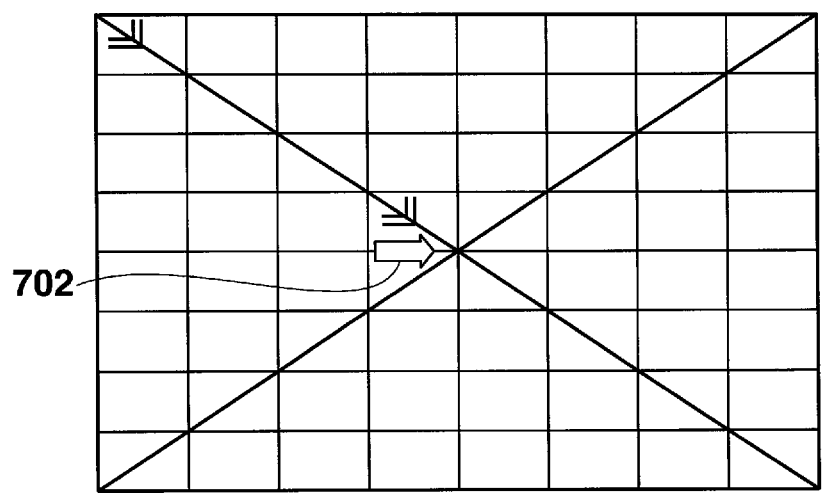
FIG. 23 is a diagram illustrating another example of the adjustment chart according to the fourth embodiment.

At this point, the projection adjustment unit 40 can display, for example, as in FIG. 23, the directions in which to move the four corners of the image area first, the directions having been obtained similarly to the geometric correction processing according to the embodiment.

In other words, for example, as in FIG. 23, when the top left corner is being adjusted, an arrow sign 702 that indicates to move the top left corner rightward can be displayed.

By doing so, the user can know in which direction the corner needs to be moved (can be moved) first, and the embodiment enables a reduction in the number of operations for adjustments for geometric correction and the shortening of time for adjustments for geometric correction.

Fifth Embodiment

Next, a fifth embodiment will be described.

The first to fourth embodiments can be used in combination.

For example, it is possible to adjust the position and posture of the projector 1 by using the first embodiment and appropriately adjust a projection state as well as to adjust, for example, a projected image's distortions that cannot be adjusted in the position and posture of the projector 1 (that exceed the adjustment range) by the geometric correction by using the third or fourth embodiment.

At this point, an adjustment chart is formed by combining the first and third embodiments.

Figure 24:
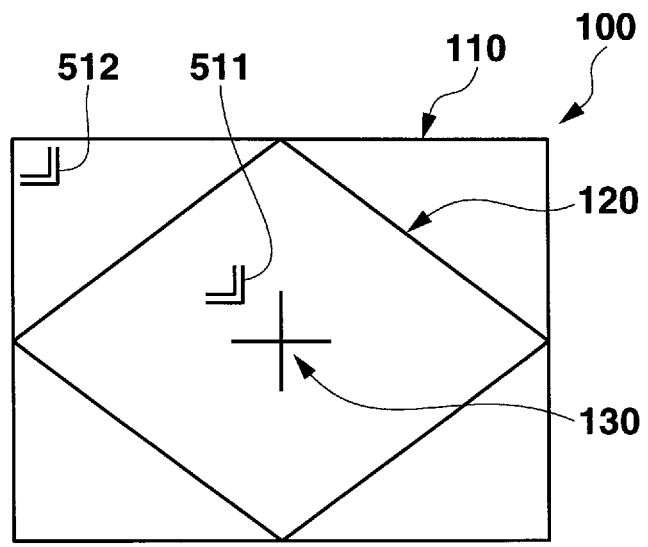
FIG. 24 is a diagram illustrating an example of an adjustment chart according to a fifth embodiment.

In other words, for example, as illustrated in FIG. 24, the adjustment chart 100 according to the first embodiment, which includes the outer frame 110, the rhombus 120, and the cross mark 130, is provided with the first correction position guide mark 511 and the first correction position mark 512 according to the third embodiment.

In the adjustments of the position and posture of the projector 1, the adjustment chart 100 according to the first embodiment, which is illustrated in FIG. 2, is used, and not the adjustment chart 100 according to the first embodiment but the adjustment chart according to the third embodiment may be used when geometric correction is subsequently performed.

Moreover, an adjustment chart may be formed by combining the first and fourth embodiments.

Figure 25:
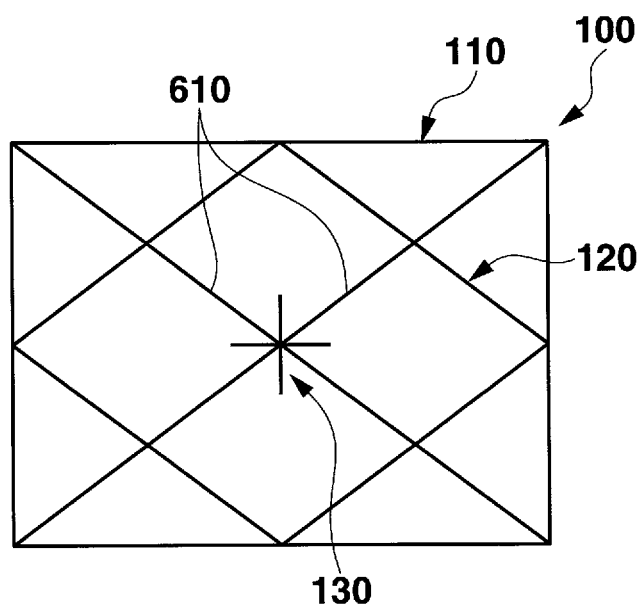
FIG. 25 is a diagram illustrating another example of the adjustment chart according to the fifth embodiment.

In other words, for example, as illustrated in FIG. 25, the adjustment chart 100 according to the first embodiment may be provided with the cross lines 610 according to the fourth embodiment.

Moreover, it is natural that the third and fourth embodiments could also be used for the alignment of a plurality of projectors as in the second embodiment.

Moreover, the combination of the first and third embodiments, the combination of the first and fourth embodiments, and the combination of the first, third, and fourth embodiments can also be used for the alignment of a plurality of projectors as in the second embodiment.

With the combinations, the effects according to the embodiments can be obtained.

The present invention is not limited to the embodiments as they are, and can be embodied in the implementation stage by deforming the components within a range that does not depart from its spirit.

Moreover, various embodiments of the invention can be formed by an appropriate combination of a plurality of the components disclosed in the embodiments.

For example, even if some components are deleted from all the components illustrated in the embodiments, if the problem stated in the related art, the problem being attempted to be solved by the embodiments of the invention, can be solved and, if the effects of the embodiments of the invention can be obtained, the configuration where the components have been deleted can be extracted as an embodiment of the invention.

Furthermore, the components over the different embodiments may be combined as appropriate.

What is claimed is:

1. A projection apparatus comprising:
    an image projection unit configured to project an image onto a projection target;
    an adjustment chart projection unit configured to project an adjustment chart indicating a projectable area;
    an image capturing unit configured to acquire a captured image of the projection target on which the adjustment chart has been projected; and
    a CPU configured to identify, using the captured image, a contour of the projectable area based on a part of the adjustment chart projected by the adjustment chart projection unit;
    wherein:
    the contour is a rectangle; and
    the adjustment chart includes:
        at least one first point provided, excluding vertices, on each of contour segments of the rectangle; and
        at least two first lines having the first point at one end of each of the first lines.

2. The projection apparatus according to claim 1, wherein the first line is a line linking two of the first points provided on two of the contour segments lying next to each other.

3. The projection apparatus according to claim 2, wherein the first line forms a part of a rhombus.

4. The projection apparatus according to claim 2, wherein the first line forms a part of an ellipse.

5. The projection apparatus according to claim 1, wherein the first line is a straight line.

6. The projection apparatus according to claim 1, wherein the first line is a curved line.

7. The projection apparatus according to claim 1, wherein the adjustment chart further includes a second line representing the contour.

8. The projection apparatus according to claim 1, wherein the adjustment chart further includes a straight line representing a horizontal direction of the projectable area and a straight line representing a vertical direction of the projectable area.

9. The projection apparatus according to claim 1, further comprising:
    a projection area changing unit configured to change the projectable area; and
    an adjustment value calculation unit configured to calculate, based on the captured image, an adjustment value related to a drive amount of the projection area changing unit for driving the projection area changing unit and adjusting a positional relationship between the projection target and the projectable area.

10. The projection apparatus according to claim 9, wherein the projection area changing unit includes a zoom mechanism configured to optically adjust a size of the projectable area.

11. The projection apparatus according to claim 9, wherein the projection area changing unit includes a position/posture adjustment mechanism configured to change a position or posture of the projection apparatus to change a projection direction.

12. The projection apparatus according to claim 1, further comprising an image conversion unit configured to perform a geometric correction on the image.

13. A projection control apparatus comprising:
    an image projection control unit configured to control a plurality of projection apparatuses to project images onto a projection target;
    an adjustment chart projection unit configured to control to project, from each of the plurality of projection apparatuses, an adjustment chart indicating a projectable area; and
    a control unit configured to identify, using acquired captured images of the projection target on which the adjustment charts have been projected, a contour of the projectable area based on a part of the adjustment charts projected by the control of the adjustment chart projection unit,
    wherein the adjustment chart projection unit controls to project the adjustment charts to have colors that are different among the plurality of projection apparatuses.

14. A projection system comprising:
    the projection control apparatus according to claim 13; and a plurality of projection apparatuses to be controlled by the projection control apparatus.

15. The projection system according to claim 14, wherein the projection control apparatus causes the plurality of projection apparatuses to project such that projection areas overlap one another.

16. The projection system according to claim 14, wherein the projection control apparatus causes the plurality of projection apparatuses to project in a manner of forming one image by arranging projection areas by the plurality of projection apparatuses such that at least parts of the projection areas are different in position from one another.

17. A projection state adjustment method for adjusting a projection area on a projection target in a projection apparatus for projecting an image onto the projection target, the method comprising the processing of:
adjusting horizontality or verticality of the projection apparatus with respect to the projection target, and adjusting a reference angle of an angle of view of the projection area;
rotating an orientation of the projection apparatus in a horizontal direction or a vertical direction, and making a top side and a bottom side of the projection area horizontal with respect to the projection target or making a left side and a right side of the projection area vertical with respect to the projection target;
moving the projection apparatus in the horizontal direction or the vertical direction, and adjusting a position in the horizontal or vertical direction of the projection area with respect to the projection target;
rotating the orientation of the projection apparatus in the vertical direction or the horizontal direction, and adjusting the position in the vertical or horizontal direction of the projection area with respect to the projection target; and
adjusting an optical system of the projection apparatus, and changing a size of the projection area.

18. The projection state adjustment method according to claim 17, further comprising the processing of deforming the projection area by geometric correction.

19. A projection apparatus comprising:
an image projection unit configured to project an image onto a projection target;
a chart generation unit configured to generate an adjustment chart including a line representing a diagonal of an image area;
an image capturing unit configured to capture the projection target on which the adjustment chart generated by the chart generation unit has been projected, and to acquire the captured image;
a parameter determination unit configured to determine a correction parameter based on a position of an intersection of the projected diagonal and an outer frame of the projection target in the captured image; and
an image conversion unit configured to perform a geometric correction on an original image to be projected based on the correction parameter determined by the parameter determination unit.

20. The projection apparatus according to claim 19, wherein
the parameter determination unit determines a direction in which to move a corner of the image area first in the geometric correction, based on the position of the intersection of the projected diagonal and the outer frame of the projection target, and
the chart generation unit generates the adjustment chart while including in the adjustment chart a display of the direction in which to move the corner.

21. The projection apparatus according to claim 19, wherein the parameter determination unit determines the correction parameter to cause the diagonal to coincide with the diagonal of the projection target.

22. The projection apparatus according to claim 19, wherein the chart generation unit generates the adjustment chart while including in the adjustment chart a correction position guide mark representing the corner that is currently being adjusted when sequentially determining four corners of the image area in a projection area.

23. A projection control apparatus comprising:
an image projection control unit configured to control a plurality of projection apparatuses to project an image onto a projection target;
a chart generation unit configured to generate an adjustment chart including a line representing a diagonal of an image area;
a captured image acquisition unit configured to acquire a captured image of the projection target on which the adjustment chart generated by the chart generation unit has been projected by each of the plurality of projection apparatuses;
a parameter determination unit configured to determine a correction parameter based on each captured image acquired by the captured image acquisition unit; and
an image conversion unit configured to perform a geometric correction on an original image projected by each of the plurality of projection apparatuses based on the correction parameter determined by the parameter determination unit,
wherein the chart generation unit generates the adjustment charts to have colors different among the plurality of projection apparatuses.

24. A projection system comprising:
the projection control apparatus according to claim 23; and
a plurality of projection apparatuses to be controlled by the projection control apparatus.

25. The projection system according to claim 24, wherein the projection control apparatus performs a geometric correction such that projection areas by the plurality of projection apparatuses overlap one another.

26. The projection system according to claim 24, wherein the projection control apparatus causes the plurality of projection apparatuses to project in a manner of forming one image by arranging projection areas by the plurality of projection apparatuses such that at least parts of the projection areas are different in position from one another.

27. A projection state adjustment method to be used by a projection apparatus for projecting an image onto a projection target, the method comprising the processing of:
projecting an adjustment chart including a line representing a diagonal of an image area;
capturing the projection target on which the adjustment chart has been projected and acquiring the captured image;
determining, based on the captured image, a correction parameter based on a position of an intersection of the projected diagonal and an outer frame of the projection target; and
performing a geometric correction on an original image to be projected, based on the determined correction parameter.

* * * * *